United States Patent
O'Neill et al.

(10) Patent No.: US 11,032,475 B2
(45) Date of Patent: *Jun. 8, 2021

(54) PASSIVE METHOD TO MEASURE STRENGTH OF TURBULENCE

(71) Applicant: Mission Support and Test Services, LLC, Las Vegas, NV (US)

(72) Inventors: Mary Morabito O'Neill, Santa Barbara, CA (US); David Terry, Santa Barbara, CA (US)

(73) Assignee: Mission Support and Test Services, LLC, North Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/539,891

(22) Filed: Aug. 13, 2019

(65) Prior Publication Data
US 2019/0373172 A1 Dec. 5, 2019

Related U.S. Application Data

(63) Continuation of application No. 15/201,306, filed on Jul. 1, 2016, now Pat. No. 10,389,940.

(Continued)

(51) Int. Cl.
*H04N 5/232* (2006.01)
*G01W 1/00* (2006.01)
(Continued)

(52) U.S. Cl.
CPC .......... *H04N 5/23254* (2013.01); *G01W 1/00* (2013.01); *G06T 5/003* (2013.01);
(Continued)

(58) Field of Classification Search
CPC .......... H04N 5/23254; H04N 5/23229; G08G 5/0091; G06T 5/50; G06T 5/10; G06T 5/003; G01W 1/00
See application file for complete search history.

(56) References Cited

U.S. PATENT DOCUMENTS 5,303,024 A    4/1994   Thierman
7,685,873 B2 *   3/2010   Shapira .................... G01P 5/26
                                                          73/170.16

(Continued)

OTHER PUBLICATIONS

Sydney Goldstein, "Fluid Mechanics in the First Half of this Centruy", Harvard University, Cambridge, Massachusetts, Annu. Rev. Fluid Mech. 1969.1:1-29, downloaded from www.annualreviews. org, 29 pages, date unknown.

(Continued)

*Primary Examiner* — Tat C Chio
(74) *Attorney, Agent, or Firm* — Weide & Miller, Ltd.

(57) ABSTRACT

Disclosed is a method to passively measure and calculate the strength of turbulence via the index of refraction structure constant $C_n^2$ from video imagery gathered by an imaging device, such as a video camera. Processing may occur with any type computing device utilizing a processor executing machine executable code stored on memory. This method significantly simplifies instrumentation requirements, reduces cost, and provides rapid data output. This method combines an angle of arrival methodology, which provides scale factors, with a new spatial/temporal frequency domain method. As part of the development process, video imagery from high speed cameras was collected and analyzed. The data was decimated to video rates such that statistics could be computed and used to confirm that this passive method accurately characterizes the atmospheric turbulence. $C_n^2$ accuracy from this method compared well with scintillometer data through two full orders of magnitude and more capability is expected beyond this verification.

23 Claims, 9 Drawing Sheets

Related U.S. Application Data

(60) Provisional application No. 62/188,412, filed on Jul. 2, 2015.

(51) Int. Cl.
   *G06T 5/00* (2006.01)
   *G06T 5/10* (2006.01)
   *G06T 5/50* (2006.01)
   *G08G 5/00* (2006.01)

(52) U.S. Cl.
   CPC .............. *G06T 5/10* (2013.01); *G06T 5/50* (2013.01); *G08G 5/0091* (2013.01); *H04N 5/23229* (2013.01)

(56) References Cited

U.S. PATENT DOCUMENTS

| | | | | |
|---|---|---|---|---|
| 2011/0013016 A1* | 1/2011 | Tillotson | ................ | G01W 1/00 348/135 |
| 2015/0254813 A1* | 9/2015 | Foi | .......................... | G06T 5/002 382/275 |

OTHER PUBLICATIONS

David L. Fried, "Probability of getting a lucky short-exposure emage through turbulence*", The Optical Sciences Company, (c) Optical Society of America, vol. 68, No. 12, Dec. 12, 1978.

A. N. Kolmogorov, "The Local Structure of Turbulence in Incompressible Viscous Fluid for Very Large Reynolds Numbers", Proceeding: Mathematical and Physical Sciences, vol. 434 No. 1890, Turbulence and Stochastic Process: Komogorov's Ideas 50 Years on (Jul. 8, 1991), pp. 9-13, http://www.jstor.org/stable/51980, Royal Society Publishing, 6 pages.

Jacques M. Beckers, "Adaptive Optics for Astronomy: Principles, Performance, and Applications", Annual Reviews, www.annualreviews.org/aronline, Annu. Rev. Aston. Astrophys. 1993, 31: 13-62, Copyright © 1993 by Annual Reviews inc., date unknown, 53 pages.

M. S. Belen'kii, et al., "Experimental validation of the differential image motion lidar concept", Optic Letters, vol. 25, No. 8, © 2000 Optical Society of America, Apr. 15, 2000, 3 pages.

David H. Tofsted, Army Research Laboratory, ARL, "Turbulence Simulation: Outer Scale Effects on the Refractive Index Spectrum" Computational and Informational Sciences Directorate Battlefield Environment Division, ARL-TR-548, Nov. 2000, 50 pages.

Mikhail S. Belen'kii, et al., "Turbulence-induced edge image waviness: theory and experiment", © 2001 Optical Society of America, Applied Optics vol. 40, No. 9, Mar. 20, 2001, 8 pages.

S.Zamek, et al., "Turbulence strength estimation from an abritratry set of atmospherically degraded images", Department of Electo-Optics Engineering, Ben Gurion University, © 2006 Optical Society of America, vol. 23, No. 12, Dec. 2006, 8 pages.

Patrice Martinez, et al., "On the Difference between Seeing and Image Quality: When the Turbulence Outer Scale Enters the Game", Telescopes and Instrumentation, The Messenger 141, Sep. 2010, 4 pages.

David H. Tofsted, "Reanalysis of turbulence effects on short-exposure passive imaging", Optical Engineering, vol. 50(1), 016001, Jan. 2011, 9 pages.

Terry, et al. "(U) Real-Time Atmospheric Mitigation Sensor System (RAMS$^2$)", Fifth Gait Technologies, Inc., Santa Barbara, CA, Mar. 2012, 10 pages.

Ingmar G.E. Renhorn, et al., "Experimental observation of spatial correlation of scintillations from an extended incoherent source", Optical Engineering, SPIE DigitalLibrary.org/oe, vol. 52(2), 026001, Feb. 2013, 7 pages.

David H. Tofsted, "Extended high-angular-frequency analysis of turbulence effects on short-exposure imaging", Optical Engineering, SPIE Digital Library.org/oe, vol. 53(4), Apr. 2014, 11 pages.

"Measurements of the Refractive Index Structure Constant and Studies on Beam wander", Keiichi Yano, et al., Proc. International Conference on Space Optical Systems and Applications (ICSOS) 2014, P15, Kobe, Japan, May 7-9, 2014, 4 pages.

P. A. Konyaev, et al., "Passive Optical Methods in Measurement of the Structure Parameter of the Air Refractive Index—Inverse Problems of Atmospheric and Ocean Optics", ISSN 1024-8560, Atmospheric and Oceanic Optics, 2015, vol. 28, No. 6, (c) Pleiades Publishing, Ltd., 2015, Apr. 15, 2015, 2 pages.

Scintillometer, Wikipedia, https://en.wikipedia.org/wiki/Scintillometer, May 24, 2016, 2 pages.

"Refractive Index", Wikipedia, https://en.wikipedia.org/wiki/Refractive_index, May 24, 2016, 17 pages.

M.G. Sterenborg, et al., "Determining the refractive index structure constant using high-resolution radiosonde data", paper, 40 pages, date unknown.

Richard L. Espinola, et al., "Turbulence degradation and mitigation performance for handheld weapon ID", Infrared Imaging Systems: Design, Analysis, Modeling, and Testing XXIII, edited by Gerald C. Holst, Keith A. Krapels, Proc. of SPIE vol. 8355, 53550S (c) 2012 SPIE, date unknown, 12 pages.

* cited by examiner

PASSIVE METHOD TO MEASURE STRENGTH OF TURBULENCE

PRIORITY CLAIM

This application is a continuation of, claims priority to and the benefit of U.S. patent application Ser. No. 15/201,306 filed on Jul. 1, 2016, which claims priority to and the benefit of U.S. Provisional Patent Application No. 62/188,412 filed on Jul. 2, 2015, the contents of which are incorporated by reference in its entirety herein.

STATEMENT REGARDING FEDERAL RIGHTS

This invention was made with government support under Contract No. DE-AC52-06NA25946 and was awarded by the U.S. Department of Energy, National Nuclear Security Administration. The government has certain rights in the invention.

FIELD OF THE INVENTION

The invention relates to turbulence measurement and in particular to a method and apparatus for measurement of turbulence using image data collected from a single location.

RELATED ART

Atmospheric effects reduce the ability to make remote sensing measurements because the atmospheric effects add phase and amplitude errors (scintillation). Scintillation is defined as variations in apparent brightness or position of a distant luminous object viewed through a medium, such as the atmosphere. There are three major effects of the atmosphere on a propagating wave: absorption, scattering, and refractive-index fluctuations (optical turbulence). Turbulence remains an important unsolved problem and thus atmospheric-turbulence-induced image degradation presents a significant problem in extended range surveillance and signal processing. In many applications, atmospheric turbulence is more restrictive to viewing resolution than the diffraction limit. The diffraction limit is the imaging devices theoretical resolution limit. Algorithms used to mitigate image degradation and analyze image signals are increasingly dependent upon the character and strength of the turbulence. As such, accurate methods to measure in situ line-of-sight (LoS) turbulence levels along terrestrial horizontal or slant paths are quite important. Failure to accurately measure and determine turbulence limits image quality improvement using image processing algorithms.

Currently, an active laser scintillometer presents the best and most reliable option for measuring horizontal atmospheric turbulence strength in real time. These devices include two elements, namely a laser light transmitter and a laser light receiver, which must be carefully aligned. The laser scintillometers typically work by correlating cross-polarized or bi-chromatic laser spots at range and inferring the index of refraction structure constant, $c_n^2$, based on the received laser signal at the receiver. However, the scintillometer has its drawbacks, such as marginal portability, difficult, but critical, laser beam alignment, eye safety issues, and instrument cost. For example, the laser scintillometer requires instrumentation at both ends of its LoS measurement, and there is a maximum path length to the measurement that is often restrictive.

Many prior art methods to produce a reliable passive (one-sided) $c_n^2$ measurement have long been proposed. Proposed passive methods have simply been inadequate, require special setup, or are not applicable to horizontal paths. The leading prior art contenders for turbulence measure can be placed into three general categories: (1) pointing and angle of arrival (AoA) statistical methods, (2) radiosonde, and (3) point source spatial filtering and point source spectrum methods. As discussed above, these methods all suffer from the drawbacks of the prior art. While there are methods requiring a radial target in the scene using a radial target, the disclosed innovation avoids this drawback.

Thus, for horizontal, long range imaging, the typical methods of measuring turbulence are cumbersome. Additional background regarding prior art scintillometers and atmospheric disturbances is discussed in U.S. Pat. No. 5,303,024 issued on Apr. 12, 1994 which is incorporated in its entirety herein by reference.

SUMMARY

Disclosed herein is a new method to passively measure the strength of turbulence via the index of refraction structure constant $C_n^2$ from video imagery. This method significantly simplifies instrumentation and reduces cost. This method combines the angle of arrival methodology which provides scale factors, with a new spatial/temporal frequency domain method. As part of the development process, a large quantity of video imagery from high speed cameras was collected and analyzed. This high speed data was decimated to video rates such that statistics could be computed and used to confirm the new, passive method that characterizes the strength of the atmospheric turbulence. $C_n^2$ accuracy from this method compared well with scintillometer data through two full orders of magnitude and more capability is expected beyond this verification.

To overcome the drawbacks of the prior art, a method for determining turbulence information for an atmospheric distance is disclosed, where atmospheric distance measures the separation between observer and object of interest through some distribution of atmospheric-induced turbulence. The atmospheric distance may also be referred to as a path, a path to an object, image path, or path integrated turbulence. In one example embodiment, the method includes obtaining image data with an image capture device such that the image data representing an image of a scene over the atmospheric distance. This method then performs spatial/temporal spectrum characterization processing on at least a portion of the image data to generate spatial/temporal spectrum characterization data. High confidence block shift processing also occurs on at least a portion of the image data to generate high confidence block shift turbulence characterization data. Then combining occurs to combine the spatial/temporal spectrum characterization turbulence data and the high confidence block shift turbulence data to calculate the strength of turbulence information.

In one embodiment the image data is an array of pixel data from twenty or more frames of successive image data from the image capture device. The image capture device may be a video camera. This method is passive, using only image data captured at a location of the image capture device without a remote optic signal transmitter. The method may further include processing the image data utilizing the turbulence data to remove aberrations in the image caused by the turbulence over the atmospheric distance.

In one variation, the spatial/temporal spectrum characterization processing includes, calculating or receiving a scale factor based on system parameters and reading image data to create an image stack. Then, calculating variance data over time for pixels in the image stack to create a single variance image. Then performing a Fourier transform on the variance image data rows and columns to generate power spectral density data. Next, averaging the power spectral density data to obtain average power spectral density data and processing the average power spectral density data in relation to a Kolmogorov spectrum to obtain a value proportional to the index of refraction structure constant ($c_n^2$). This operation then multiplies the value proportional to the index of refraction structure constant ($c_n^2$) by the scale factor based on system parameters to generate the spatial/temporal spectrum characterization data being the estimated index of refraction structure constant ($c_n^2$).

In one variation, the high confidence block shift processing includes processing image data to create image data blocks and calculating an information content metric for one or more image data blocks. Then, tracking information content metric for one or more image data blocks over time and recording or designating block tracks which meet a predetermined threshold as surviving blocks. This variation also calculates pixel variance value for surviving blocks. For one or more pixel values calculating platform motion using differential frame motion. For one or more pixel variance values, calculating mean variance from one or more sets of pixel variance values and compensating for platform motion to determine turbulence data proportional to the index of refraction structure constant ($c_n^2$).

In one embodiment, the step of combining the spatial/temporal spectrum characterization turbulence data and the high confidence block shift turbulence data includes rescaling the spatial/temporal spectrum characterization turbulence data based on an average of a ratio of the high confidence block shift turbulence data and spatial/temporal spectrum characterization data for a period of time.

Also disclosed is a computer-readable medium having non-transitory computer-executable instructions for determining turbulence information for an atmospheric distance. The computer-executable instructions are executed on a processor and include the steps of obtaining image data with an image capture device such that the image data represents an image of a scene and performing spatial/temporal spectrum characterization processing on at least a portion of the image data to generate spatial/temporal spectrum characterization data. An additional step of performing high confidence block shift processing on at least a portion of the image data to generate high confidence block shift turbulence data occurs and then combining the spatial/temporal spectrum characterization turbulence data and the high confidence block shift turbulence data to calculate the path integrated turbulence information.

In one embodiment the image data is an array of pixel data from twenty or more frames of successive image data from the image capture device. The image capture device may be a video camera. This method is passive, using only image data captured at a location of the image capture device without a remote optic signal transmitter. The method may further include processing the image data utilizing the turbulence data to remove aberrations in the image caused by the path integrated turbulence.

In one variation, the spatial/temporal spectrum characterization processing includes, calculating or receiving a scale factor based on system parameters and reading a sequence of image data to create an image stack. Then, calculating variance data over time for pixels in the image stack and perform a Fourier transform on the variance data to generate power spectral density data. Next, averaging the power spectral density data to obtain average power spectral density data and processing the average power spectral density data in relation to a Kolmogorov spectrum to obtain a value proportional to the index of refraction structure constant ($c_n^2$). This operation then multiplies the value proportional to the index of refraction structure constant ($c_n^2$) by the scale factor to generate the spatial/temporal spectrum characterization data being the estimated index of refraction structure constant ($c_n^2$).

In one variation, the high confidence block shift processing includes processing image data to create image data blocks and calculating an information content metric for one or more image data blocks. Then, tracking information content metric for one or more image data blocks over time and recording or designating block tracks which meet a predetermined threshold as surviving blocks. This variation also calculates pixel variance value for surviving blocks. For one or more pixel values calculating platform motion using differential frame motion. For one or more pixel variance values, calculating mean variance from one or more sets of pixel variance values and compensating for platform motion to determine turbulence data proportional to the index of refraction structure constant ($c_n^2$).

In one embodiment, the step of combining the spatial/temporal spectrum characterization turbulence data and the high confidence block shift turbulence data includes rescaling the spatial/temporal spectrum characterization turbulence data based on an average of a ratio of the high confidence block shift turbulence data and spatial/temporal spectrum characterization data for a period of time.

In another embodiment, a system for determining the path averaged turbulence information is provided. This system includes an image capture device configured to capture frames of image data and a processor configured to execute computer-executable instructions based on the image data to calculate turbulence data. A memory stores non-transitory computer-executable instructions, readable by the processor, for determining turbulence information for an atmospheric distance. The computer-executable instructions are executed on the processor and comprise the steps of obtaining image data with an image capture device such that the image data representing an image of a scene over the atmospheric distance. The computer-executable instructions are also configured to perform spatial/temporal spectrum characterization processing on at least a portion of the image data to generate spatial/temporal spectrum characterization data and also perform high confidence block shift processing on at least a portion of the image data to generate high confidence block shift turbulence data. The computer-executable instructions also combine the spatial/temporal spectrum characterization turbulence data and the high confidence block shift turbulence data to calculate the turbulence information for the atmospheric distance.

In one embodiment the image data is an array of pixel data from twenty or more frames of successive image data from the image capture device. The image capture device may be a video camera. This method is passive, using only image data captured at a location of the image capture device without a remote optic signal transmitter. The method may further include processing the image data utilizing the turbulence data to remove aberrations in the image caused by the turbulence over the atmospheric distance.

In one variation, the spatial/temporal spectrum characterization processing includes, calculating or receiving a scale factor based on system parameters and reading image data to create an image stack. Then, calculating variance data over time for pixels in the image stack and perform a Fourier transform on the variance data to generate power spectral density data. Next, averaging the power spectral density data to obtain average power spectral density data and processing the average power spectral density data in relation to a Kolmogorov spectrum to obtain a value proportional to the index of refraction structure constant ($c_n^2$). This operation then multiplies the value proportional to the index of refraction structure constant ($c_n^2$) by the scale factor to generate the spatial/temporal spectrum characterization data being the estimate of the index of refraction structure constant ($c_n^2$).

In one variation, the high confidence block shift processing includes processing image data to create image data blocks and calculating an information content metric for one or more image data blocks. Then, tracking information content metric for one or more image data blocks over time and recording or designating block tracks which meet a predetermined threshold as surviving blocks. This variation also calculates pixel variance value for surviving blocks. For one or more pixel values calculating platform motion using differential frame motion. For one or more pixel variance values, calculating mean variance from one or more sets of pixel variance values and compensating for platform motion to determine turbulence data proportional to the index of refraction structure constant ($c_n^2$).

In one embodiment, the step of combining the spatial/temporal spectrum characterization turbulence data and the high confidence block shift turbulence data includes rescaling the spatial/temporal spectrum characterization turbulence data based on an average of a ratio of the high confidence block shift turbulence data and spatial/temporal spectrum characterization data for a period of time.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

To overcome the drawbacks of the prior art, a new approach is disclosed for turbulence analysis and measurement. This invention significantly simplifies field measurements and only uses a video camera or any other image capture device, a computer or computing device, with memory storing non-transitory machine executable code, to process data that effectively replicates the ability of a scintillometer over more than two orders of magnitude of $C_n^2$. After a latency period of 30-40 frames of image data collection, data can be provided every frame up to the limit of the turbulence time scale, typically 1 msec for visible light.

This innovation uses the combination of the STL spatial/temporal characterization (STSC) of turbulence and the high confidence block shift (HCBS) methods to calculate turbulence based on image data, such as data from 30 or more images captured by an image capture device. The combination of these method is reliable and replicates the results from a scintillometer using only an image(s) capture device located at one location.

Figure 1:
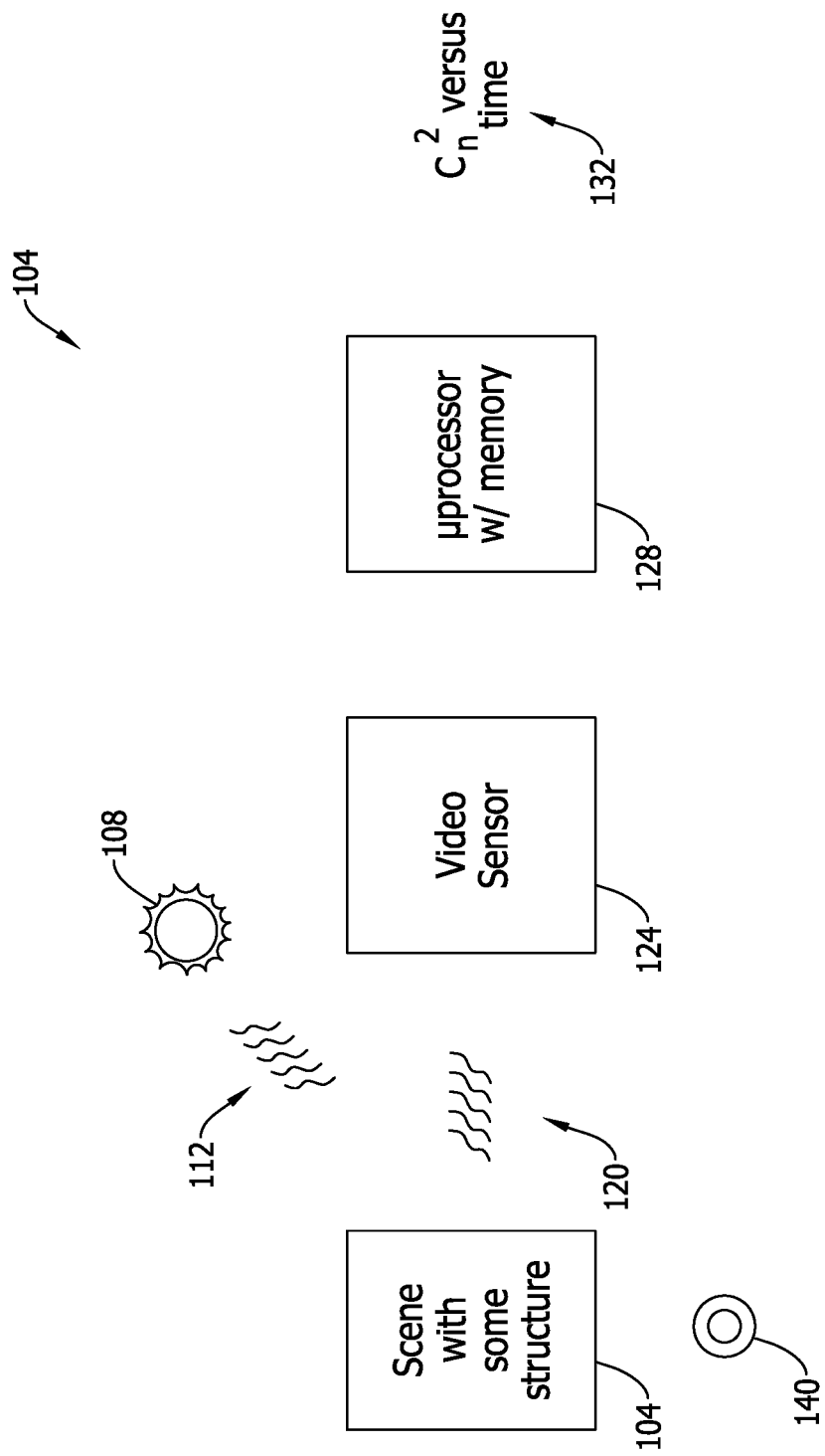
FIG. 1 is a block diagram of a block diagram of an example embodiment of the turbulence calculation system with imaging unit.
Figure 2:
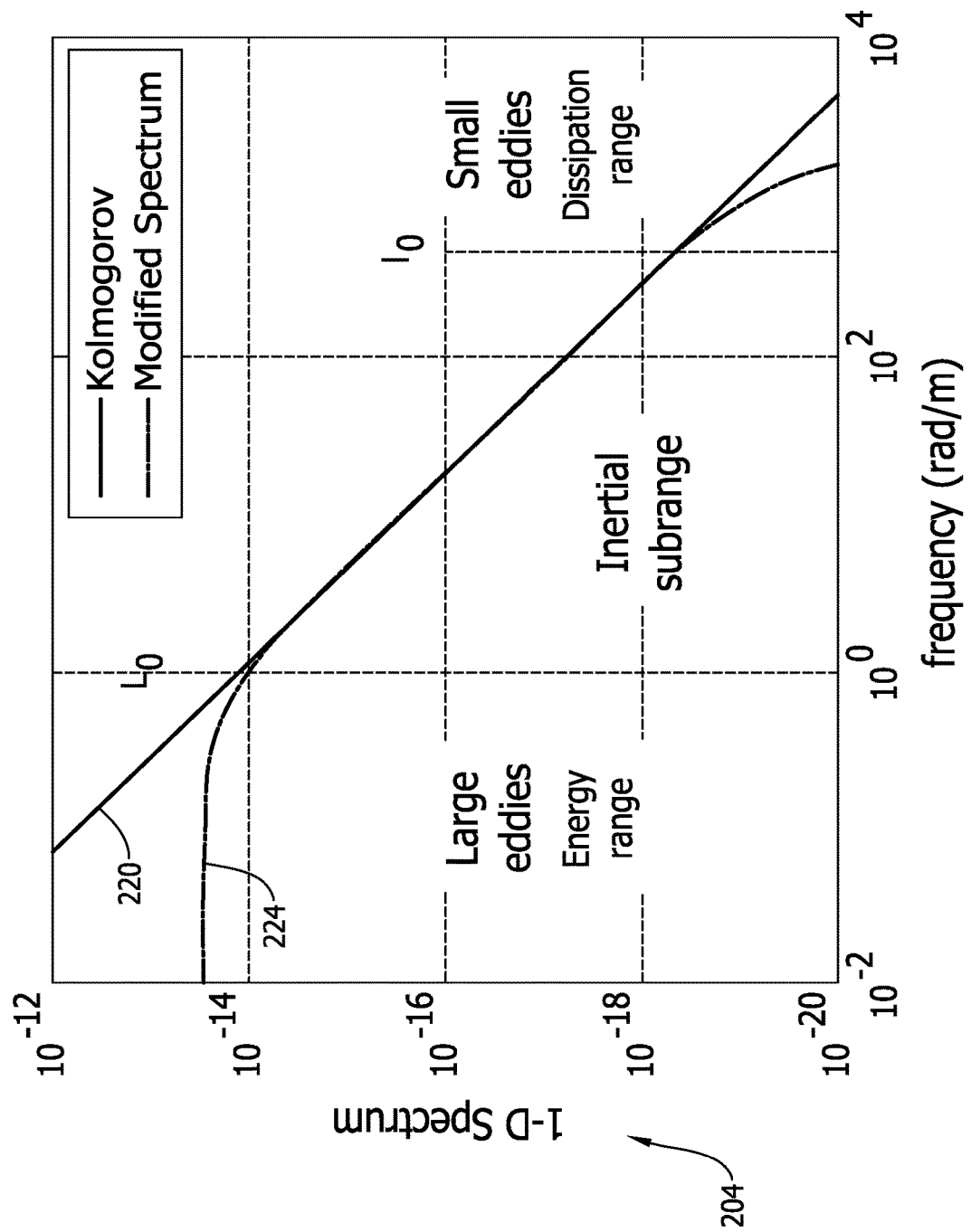
FIG. 2 illustrates 1-D power spectral density (PSD) for two turbulence models.

FIG. 1 provides an exemplary diagram of a possible implementation. As shown in FIG. 1, illumination 112 from the sun 108 or other source is reflected from objects 104 in the scene. The reflection 120 travels away from the object 104 toward a video sensor 124, such as a video camera or any image capture device. In one embodiment the image capture device is a video camera capable of capturing successive images. Image data is capture by image sensor pixels which are arranged in an array forming rows and columns of pixels. For the STSC method a running stack of frames over time is used invoking Taylor's frozen hypotheses. For the HCBS method, these pixels may be subdivided into smaller arrays or blocks of pixels. As shown, this method and apparatus for turbulence measurement and calculation can replace a scintillometer yet only requires a video sensor 124 (single location) which may be mounted on a tripod or other secure structure or support. Knowledge of the video sensor characteristics along with image data are inputs to the algorithms.

Figure 8:
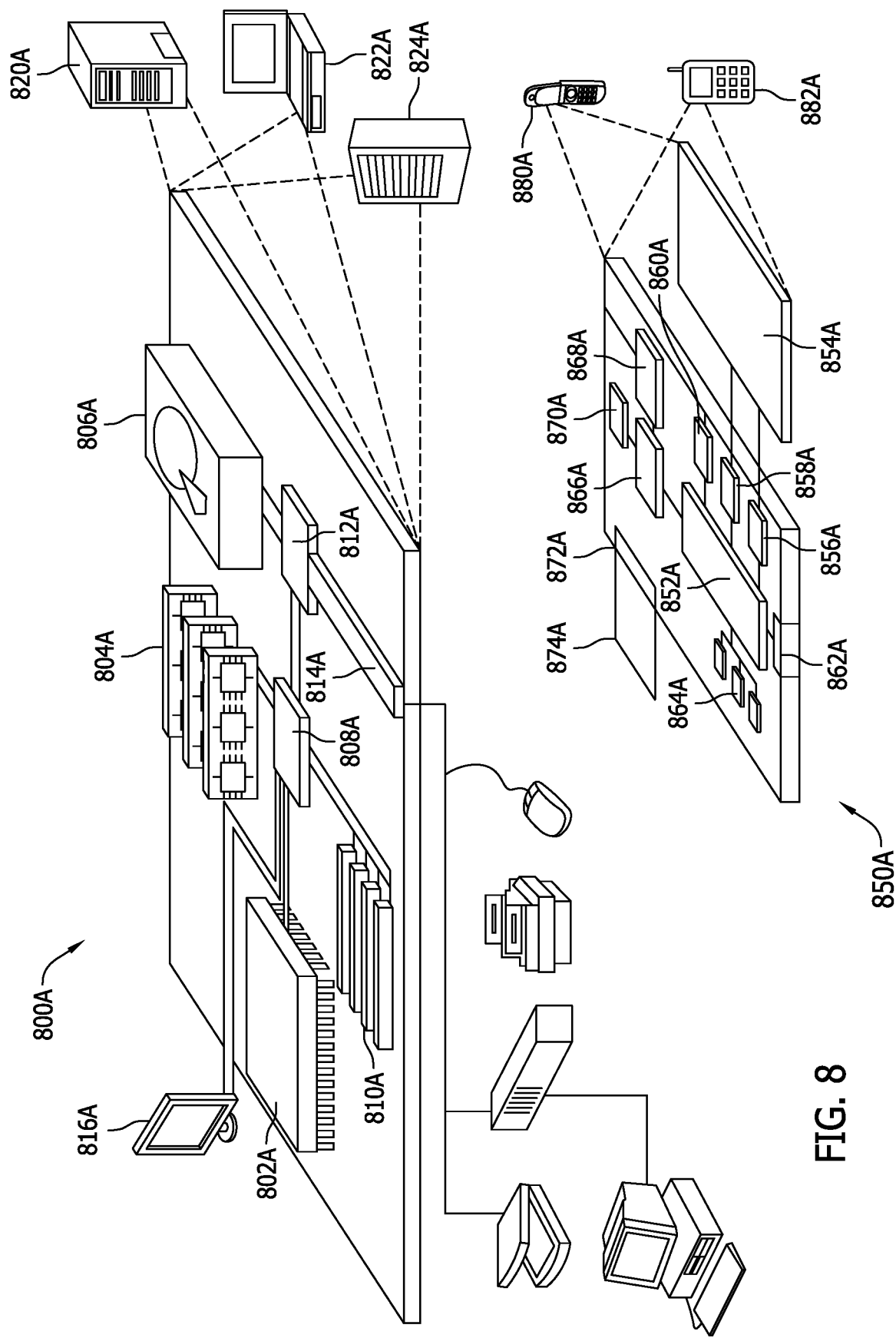
FIG. 8 is a block diagram showing example or representative computing devices and associated elements that may be used to implement the systems method and apparatus described herein.

The image data may be stored in the video sensor (camera) 124 or provided directly to a computing device 128, such as a processor (microprocessor) with memory. Any type image capture device capable of capturing successive image data may be utilized. The camera or video sensor may be separate from the computing device or the computing device and camera may be combined. In one embodiment the turbulence data is provided with the image data for the benefit of subsequent processing. The memory is configured to store, in a non-transitory state, machine readable code capable of being executed by the processor 128 to process the image data. The algorithms, which are discussed below in detail, are in the form of equations utilized for processing the image data to calculate turbulence in the air space 120 between the scene 104 that is captured in the image and the video sensor 124. The output of processor (computer) 128 provides $C_n^2$ verses time. Using this value and knowledge of turbulence in general, image processing may be improved as can target acquisition and analysis. In one embodiment, the inputs (data) to the software code which are used for processing include but are not limited to sensor characteristics such as aperture and instantaneous field of view (IFOV), image data and number of frames in an image stack. An exemplary computing device is shown in FIG. 8 and associated text is provided below.

In one embodiment, accuracy of the HCBS method can be improved by placing optional targets 140 in the scene. The targets have no effect on the STSC results. However, this is not required such that as long as the scene has some structure and an approximate distance to this scene is known, a target 140 is not needed. This is an advantage over prior art systems.

In operation, the reflected light 120 from the scene travels through the turbulent atmosphere 120, which is affected by the sun 108 heating the air and land. The image is captured by the entrance aperture of the video camera or sensor 124. The exposure time is shorter than the turbulent time scale at the wavelength of the sensor 124. Stated another way, for the turbulence to be considered frozen, the exposure time must be less than the turbulent time scale.

A processor with memory 128 (such as a computer or dedicated processing device tailored to perform such processing) executes the strength of turbulence using algorithms and pixel manipulation as disclosed below to calculate turbulence, including but not limited to $C_n^2 \cdot C_n^2$ may then be save versus time as an output 132, which may be in data form or presented graphically such as plot, presented with the image data or may be used to compensate one or more other systems or image processing activities to account for the atmospheric scintillations.

There are two primary methods use for calculating or characterizing turbulence and/or other atmospheric effects. These methods are spatial/temporal spectrum characterization (STSC) and the high confidence block shift (HCBS) method. The spatial/temporal spectrum characterization (STSC) method invokes Taylor's frozen hypothesis and relies on the turbulence being equivalent in all directions. Taylor's frozen hypothesis is generally understood by one of ordinary skill in the art and not described in great detail herein. Additional information regarding Taylor's frozen hypothesis is available in the references which follow and is generally known and understood by one of ordinary skill in the art.

Disclosed herein is an innovative hybrid passive method to measure the index of the refraction structure constant, $c_n^2$. This is the first step to reliable image degradation compensation for imaging through long-range horizontal paths. Numerous other uses are possible. This method is fully passive (based on collected image data) using image data to image statistical variation over time and not just differential image motion to extrapolate $c_n^2$. In addition, compensation for variations in the strength of turbulence are corrected for via aperture size and isoplanatic patch estimates as discussed below. In addition, the high confidence block shift (HCBS) method combines the angle of arrival method in connection with Tofsted theory to account for near and far field variations in the wavefront shape. Because both these methods weigh turbulence differently, the combination allows for a better estimate of $c_n^2$ as compared to prior art approaches. The combination of the STSC method with the HCBS as described below further improves the ability to extract $c_n^2$ from standard video imagery without the aid of targets or coherent remote sources.

Turbulence Theory

To aid in understanding of the following processing, generalized turbulence theory and equations are briefly discussed below. Atmospheric turbulence effects make remote sensing difficult due to the addition of spatial and spectral phase and amplitude errors. As a result, the effects of turbulence are seen in active and passive sensing. Turbulence is strongest when there is a large temperature differential between the earth (ground) and the surrounding air. When the earth is warmed by the sun, the energy is injected back into the air via the wind mixing the buoyant warm bubble of air with the surrounding cooler air. This energy dissipates into the next layer causing cell size to reduce, i.e., large cells become smaller. The larger cells act as refractive elements, and the smaller cells act as diffractive elements as optic signals pass through the cells. In general, the smallest and largest cells determine the inner ($l_0$) and outer ($L_0$) scales of turbulence. The inner scale ($l_0$) defines the size of the smallest inhomogeneities in the turbulence, below which fluid viscosity principle are used to describe air flow. The outer scale ($L_0$) defines the point beyond which the turbulence becomes anisotropic, resulting in structural and refractive index effects.

In one dimension, the following equation characterizes the atmospheric refractive index structure function with a ⅔-power law of the form:

$$D_n(r) = c_n^2 r^{2/3} \tag{1}$$

where r is the spatial separation of any two points. Over many years, this equation has been exhaustively verified via experiment. Moreover, the phase structure function of a monochromatic electromagnetic wave is known to satisfy the very same power law.

The index of refraction structure function is related to the atmospheric index of refraction covariance function B(r) by the following equation.

$$D_n(r) = 2[B(0) - B(r)]. \tag{2}$$

In this equation, B(0) is defined as variance while the variable B(r) is defined as covariance. The 3-D power spectral density (PSD) of the turbulence is defined as the Fourier transform of the index of refraction structure and is proportional to the index of refraction structure constant, $c_n^2$. The index of refraction structure constant, $c_n^2$ is generally defined as the spectral amplitude of refractive index fluctuations in the inertial subrange of turbulence.

In 1-D the PSD power law of V(k) in a log-normal distribution displays a slope of −5/3, as indicated asymptotically by V(k).

$$V(k) \equiv [0.1244 c_n^2] e^{-(k/k_1)^2} (k_0^2 + k^2)^{-5/6} \tag{3}$$

The line 220 is the PSD based on Kolmogorov's ansatz. Kolmogorov's ansatz is generally known or knowable by one of ordinary skill in the art in this field and as such is not described in detail herein. The dashed line 224 is the modified spectrum that includes inner ($l_0$) and outer ($L_0$) scale effects and is equal to the Kolmogorov spectrum in the inertial sub-range between the inner and outer scales. The method presented herein takes advantage of the proportionality of $c_n^2$ to the 1-D spectrum. Fitting a spatial spectrum in the x or y direction derived from the measurable temporal scintillation index from the z direction to this PSD is the basis for the spatial/temporal spectrum characterization (STSC) method described herein.

To processes the data to calculate turbulence, such as refraction structure constant $c_n^2$, two processing methods are combined. These two methods are defined herein as the STSC method and the HCBS method. Each method is discussed below in greater detail.

HCBS Methodology—Modified Angle of Arrival (AoA)

The AoA method is based on the absolute phase of a wavefront and relies upon the statistics of the phase structure function. It is modified from the following discussion to form the high confidence block shifts (HCBS) method as discussed below in more detail. Using the AoA relationship, the system computes the angle of arrival (AOA) variance using the phase structure function $D_S$ and $c_n^2$ for photons arriving at off-zenith angle $\beta$ $$\sigma_\beta^2 = \frac{D_S(D, L)}{(kD)^2} = (2.91)\xi c_n^2 L D^{-1/3}. \qquad (4)$$

where L is the distance to the area in the scene, D is the diameter of the aperture and $\xi$ is a non-linear integral dependent upon the aperture Fresnel number ($\Omega = D^2/(4\lambda L)$). Typical applications between near and far field imaging result in $\xi$ asymptotically limited to 0.78; low values of Fresnel number $\xi$ falls to 0.5 or below. See prior art reference D. H. Tofsted, "Reanalysis of turbulence effects on short-exposure passive imaging," Optical Engineering 50(1), 016001 (January 2011) for additional details.

The equation listed below (equation (5)) represents the AoA variance in radians as a function of aperture diameter D, path length L, and wave number $k = 2\pi/\lambda$. In spite of using "weak fluctuation" theory, the following equation (5) has been found valid in both weak and strong turbulence. Next the system computes the pixel variance using the focal plane IFOV as:

$$\sigma_{pixel}^2 = \frac{\sigma_\beta^2}{IFOV^2} = \frac{\sigma_\beta^2 D^2}{\lambda^2 N_{ifov}^2} \qquad (5)$$

$$N_{ifov} \equiv \frac{IFOV}{(\lambda/D)} \text{ effective pixel size relative to } D.L.$$

Combining the equations above and evaluating the constants gives the $D/r_0$ (6):

$$D/r_0 = \left[\left(1.467\xi^{-\frac{1}{2}}\right)N_{ifov}(\sigma_{pixel}^2)^{\frac{1}{2}}\right]^{6/5}. \qquad (6)$$

This modified AoA method is referred to herein as High Confidence Block Shifts (HCBS) since it can be applied in lucky region fusion (LRF) algorithms statistically on a block-by-block basis. Lucky region fusion algorithms are defined generally as one possible method of processing as defined in M. Aubailly, M. A. Vorontsov, G. W. Carhat and M. T. Valley, *Automated video enhancement from a stream of atmospherically-distorted images: the lucky-region fusion approach*, "Proceedings of SPIE", 7463 (2009).

This allows algorithms to automatically and implicitly determine the best regions in the scene for determination of $D/r_0$. Thus, a block of pixel is selected for processing. Previous AoA methods for determining the strength of turbulence fail to take into account the $\xi(\Omega)$ dependence, and they often require the user to pick the best pixels in the image to be processed prior to the determination of $c_n^2$ however, this method may determine this automatically.

Figure 3:
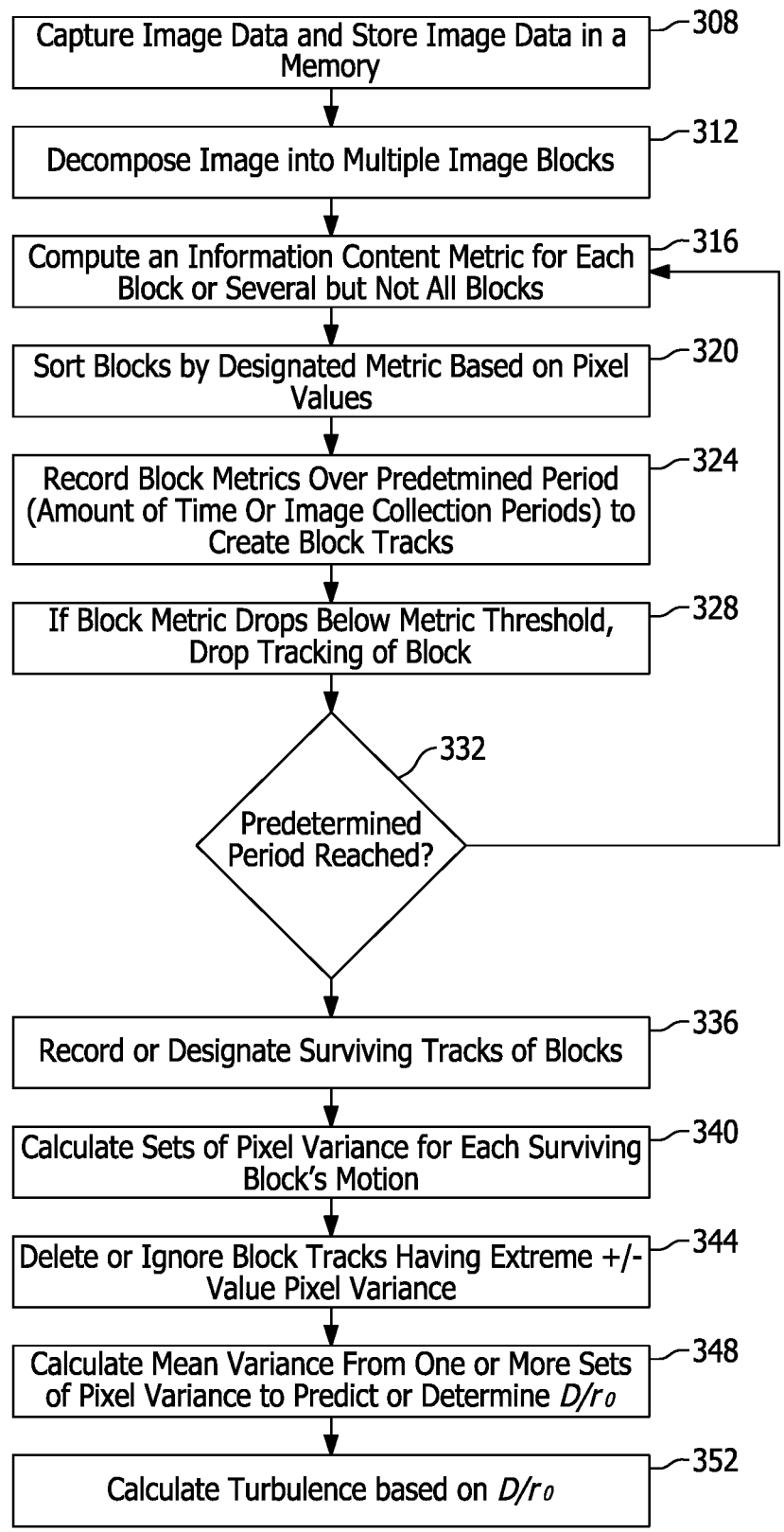
FIG. 3 illustrates one example method of operation for implementing HCBS for turbulence measurement.

FIG. 3 illustrates one example method of operation for implementing HCBS for turbulence measurement. At a step 308, an image is captured and stored in memory. The image may be a digital image formed from an array of pixels captured by a CCD or other image capture circuit or semiconductor device. At a step 312, the image is decomposed into many small blocks. In one embodiment the block size is typically 16×16 or 32×32 pixels, depending on image content, but it is contemplated that the blocks may be of any size or number of pixels and may or may not be of an equal number of pixels in the x and y axis.

At a step 316 an information content metric is computed on each block. The Information content metric can be any spatial frequency area integral such as a Sobel. At a step 320, the blocks are sorted by this metric. Sorting of the blocks is based on identifying the blocks with the best metric. At a step 324 the top two dozen or so blocks are tracked via a correlation with a reference image frame as a function of time. The reference frame can be a moving average or a particular image frame. More or fewer blocks than two dozen may be tracked. Whenever a block's correlation coefficient to the reference frame falls below a threshold, at a step 328, tracking for that block discontinues.

The method continues until a predetermined period of time is reached such as after a macroscopic period of time (e.g., some seconds of video frames) determined in a decision steps 332. If at step 332 the time period of data collection has not expired, then the operation returns to step 316. If the period of time has expired, then the operation advances to a step 336.

At step 336 the system records or otherwise designates surviving tracks of blocks. Next, this method of operation calculates, for the surviving tracks, a set of pixel variances of each surviving block's motion. This occurs at as step 340. This method generates far better statistics than simple global-jitter AoA methods. Ensemble outliers are removed from the set at a step 344. The set's mean variance can be used as a predictor of $D/r_0$ at a step 348. Using $D/r_0$ the strength of turbulence, $c_n^2$ may be calculated. This occurs at a step 352. This process may occur to calculate data to improve image quality for a given period of time, or occur continuously to improve video imagery in real time.

Typical tripods are used to support the image (video) capture equipment and supporting platform, and most often one axis (either horizontal or vertical) is more susceptible to platform motion. A further improvement to this method can be realized by implementing an angular velocity computation using differential frame motion. Sensitivity to platform motion may be reduced by using the following equation.

$$\sigma_{platform}^2 = \max(0.25, \min(\text{var}(x_j - x_{j-1}), \text{var}(y_j - y_{j-1}))). \qquad (7)$$

By differencing consecutive frames, between $j^{th}$ frame shift and $j-1^{th}$, the method of data processing is essentially using velocity of pixel motion. Without appreciable motion, the equation reverts to the constant platform motion estimate of equation 8. By using the minimum of x or y motion, this method is consistent with using $\sigma_{pixel}^2 = \min(\sigma_x^2, \sigma_y^2)$ and requires only one "stable" platform axis for $D/r_0$. As a result, an improved implementation of equation 6 becomes the following equation 8:

$$D/r_0 \approx c[\max(0, \sigma_{pixel}^2 - \sigma_{platform}^2)]^{3/5}, \qquad (8)$$

where $c = c(N_{ifov}, \Omega)$ is a known constant. In the simplest implementation, this method calculation approximates the platform variance with a small constant (typically 0.5 pixels$^2$), and the value or variable $\Omega$ may often be set to its asymptotic limit of $\xi = 0.78$.

Live Test Results—HCBS Method

Figure 4A:
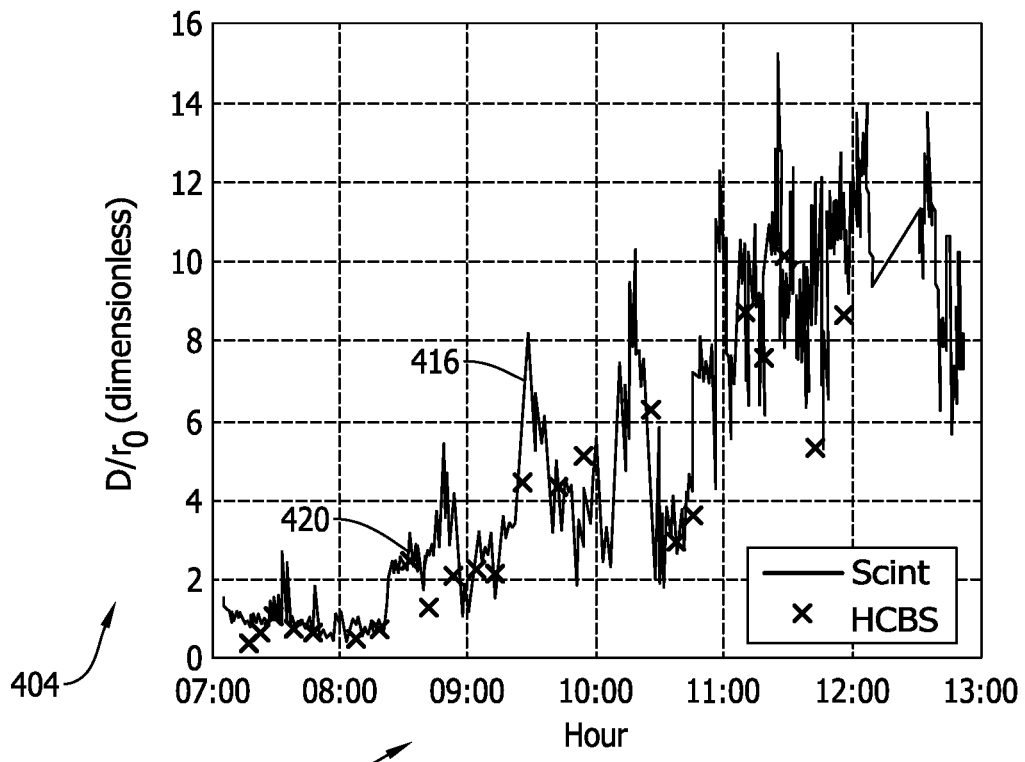
FIG. 4A, and FIG. 4B represent the results of the HBCS method with (a) $D/r_0$ and (b) $c_n^2$ using different approaches as compared to scintillometer data.
Figure 4B:
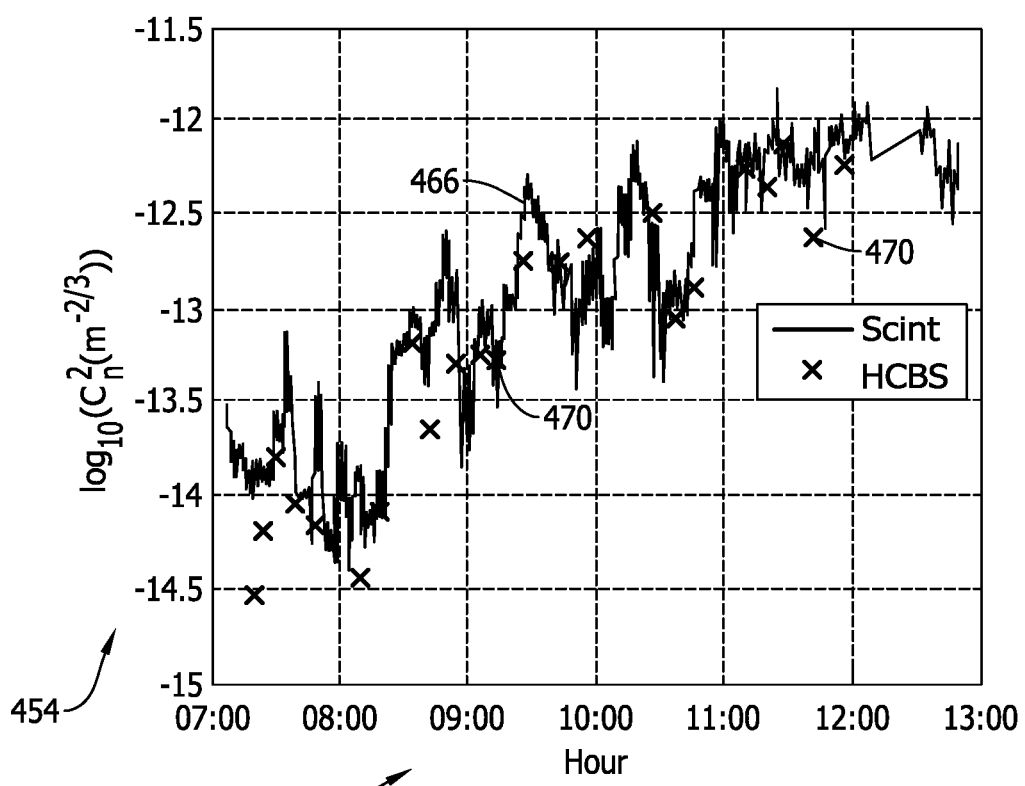

Using Photron video data, the results shown in FIG. 4 were obtained. FIG. 4A, and FIG. 4B represent the results of the HBCS method with (a) $D/r_0$ and (b) $c_n^2$ using different approaches as compared to scintillometer data, which is the prior art method. In FIG. 4A, the vertical axis 404 represents $D/r_0$. The horizontal axis 408 represents time, in hours. The solid lines represent the prior art scintillometer data 416 and is the standard by which system are judged and is considered highly accurate. As can be seen in the plot, the value of $D/r_0$ varies over time based on numerous factors. The variation of the turbulence strength over time is on a much longer time scale than typical video rates. The scintillometer typically only captures an average $C_n^2$ per minute, but the methods presented in this invention allow measurements at video rates allowing for a better estimate of $C_n^2$ for image processing applications. The X plots represents HCBS data points 420 for a series of image grabs. As can be seen, these points are highly correlated with and track with great accuracy the scintillometer data 416 without the associated drawbacks of prior art systems.

In FIG. 4B the vertical axis 454 represents $C_n^2$ shown as a log value. The horizontal axis 458 represents time, in hours. The solid lines represent the prior art scintillometer data 466 and is the standard by which system are judged and is considered highly accurate. As can be seen in the plot, the value of $C_n^2$ varies over a time scale much longer than video rates and is based on numerous factors. The X plots represents HCBS data points 470. As can be seen, the HCBS data points 470 are highly correlated with and track with great accuracy the scintillometer data 466 without the associated drawbacks of the prior art.

Combining this method with the STSC method below further reduces platform motion effects.

Spatial/Temporal Spectrum Characterization (STSC) Method

The STSC method of turbulence characterization is based upon spatially measuring the power spectral density (PSD) using the per-pixel temporal "scintillation index" or covariance, which corresponds to the index of refraction structure function which is measured for each pixel for a temporal stack of frames. This is not a differential method as has been done in the prior art, but is a normalized statistical method that can be correlated directly with Kolmogorov turbulence theory (see 1941 Kolmogorov works). This method is a new approach to measuring the strength of turbulence.

Figure 5A:
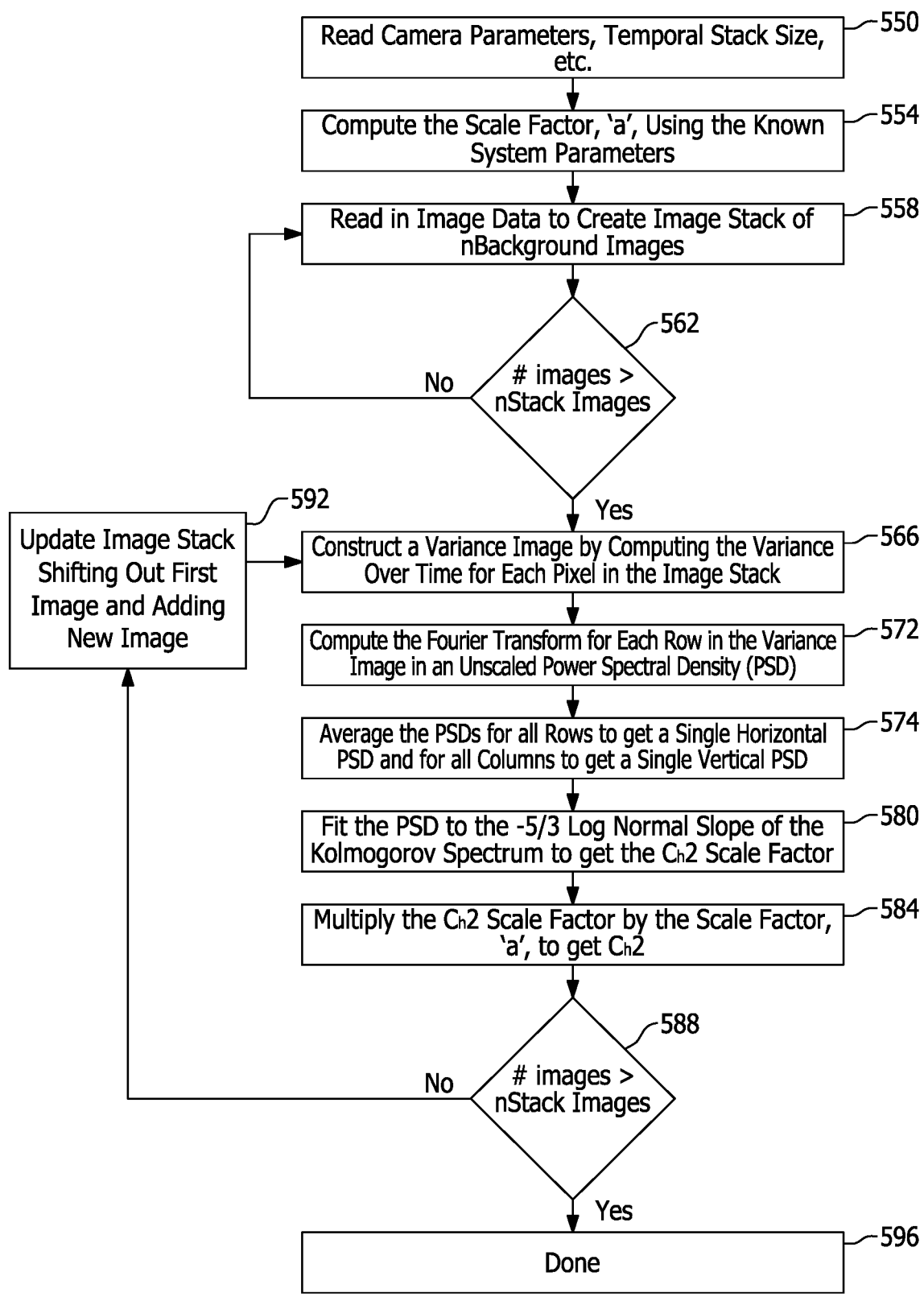
FIG. 5A illustrates one example method of operation for implementing the STSC method turbulence measurement.

FIG. 5A illustrates one example method of operation for implementing the STSC method turbulence measurement. At a step 550, the system reads or otherwise obtains camera parameters, temporal stack size and other data used to perform the calculations. At a step 554 the system computes the scale factor, 'a', using the known system parameters. Next, at a step 558 the system reads in image data to create image stack of nBackground images. The value for n may be any whole number.

At a decision step 562 determines if the number of images is greater than the number of nStack Images. If not the operation returns to step 558. If at decision step 562 the number of images is greater than the value of nStack Images, then the operation advances to step 566. At step 566 the system constructs a single variance image by computing the variance over time for each pixel in the image stack and at a step 572 it computes the Fourier transform for each row in the variance image result in an unscaled power spectral density (PSD).

Then, at step 574 the system averages the PSDs for all rows to get a single horizontal PSD and for all columns to get a single vertical PSD. Next, at a step 580, the system fits the PSD to the $-5/3$ log normal slope of the Kolmogorov spectrum to get the $C_n^2$ scale factor. Thereafter the system, at a step 584, multiplies the $C_n^2$ scale factor by the scale factor, 'a', to get $C_n^2$. Next, at decision step 588 a determination is made whether the number if images is greater than the value of nStack Images. If not, then the operation returns to step 592 and the system updates the image stack by shifting out the first image and adding the next or a new image. The image may be the entire image or a part of the image. If the number if images is greater than the value of nStack Images then the operation completes at step 596.

The following discussed the method FIG. 5A in greater detail and with supporting equations. The computation of the statistics of the variations of each pixel over time creates a spatial 'variance' image that can be analyzed for the Kolmogorov 1-D power spectral density. This method strives to measure the strength of turbulence using only a low-end camera, with or without a target board in the scene. Both of these capabilities are significant improvements of a prior art laser source and receiver. It is important to note that the structure function D(r) (as well as its autocovariance) and the normalized intensity are related. Interestingly, using the covariance instead of the scintillation index to compute the structure function does not change the results appreciably, but it does add considerable computation time. For the results shown in this invention, the scintillation index was used in place of the structure function to save processing complexity and time. The scintillation index is defined as the normalized variance of the irradiance of the incoming wave. It is contemplated that either option may be used in practice and the claims that follow would cover both or either option.

The Rytov variance itself is the scintillation index for an unbounded plane wave in weak fluctuations based on the Kolmogorov spectrum. It is related to the estimate of $c_n^2$ using the relationship:

$$\sigma_I^2(x,y,L,t,0)=\sigma_z^2(x,y,L,t,0)=1.23c_n^2(x,y,t)k^{7/6}L^{11/6} \quad (9)$$

Given an intensity measurement imaged onto a focal plane at pixel location x, y, at time t, and based on proportionality to Kolmogorov's proposed starting point, we compute the received flux variance as the normalized variance over all pixels on the focal plane over n samples in $\Delta t$ increments as:

$$\sigma_Z^2(x, y, L, t, D) = \frac{\langle I(x, y, \tau)^2 \rangle_{\tau=t_0 \text{ to } t_0+n\Delta t} - \langle I(x, y, \tau) \rangle^2_{all\ x,y\&\tau}}{\langle I(x, y, \tau) \rangle^2_{all\ x,y\&\tau}} \quad (10)$$

In this equation the variables x, y, D, and t represent the x pixel location on the detector, the y pixel location on the detector, the diameter of the receiving aperture and the time t of the frame. The variable I represents received intensity in counts. The above equation 10 relates autocovariance statistics to the scintillation index, implicitly invoking Taylor's frozen turbulence hypothesis with inclusion of temporal averaging as assuming that turbulence is uniform in all three dimensions. Because $\sigma^2$ is computed for each pixel location x, y, an image that contains the atmospheric structure is generated for each time t, (based on statistics for times t-$\Delta t$ to t) that is relatively tolerant to tripod instability. This is a further benefit to this approach.

The Rytov variance assumes a receiver that is a point detector (ie D=0) such that there is no averaging of the patches. This received flux variance must be corrected for this finite aperture in order to scale appropriately. The ratio of the measured irradiance flux variance to the scintillation index for a plane wave for both weak and strong fluctuations is approximated in the paper: L. C. Andrews and R. L. Phillips, *Laser Beam Propagation through Random Media*, Second Edition (SPIE Press, 2005), and as shown below in the following equation 11.

$$\sigma_z^2(x, y, L, t, D) = \exp\left[\frac{0.49 \cdot \sigma_z^2(x, y, L, t, 0)}{(1 + 0.65 \cdot \Omega + 1.11 \cdot \sigma_z^2(x, y, L, t, 0)^{12/5})^{7/6}} + \frac{0.51 \cdot \sigma_z^2(x, y, L, t, 0) \cdot (1 + 0.69 \cdot \sigma_z^2(x, y, L, t, 0)^{12/5})^{-5/6}}{(1 + 0.90 \cdot \Omega + 0.62 \cdot \Omega \cdot \sigma_z^2(x, y, L, t, 0)^{12/5})^{12/5}}\right] - 1 \quad (11)$$

Where $\sigma_z^2(x,y,L,t,0)$ is the scintillation index, $\Omega$ is the Fresnel number, and D is the diameter of the entrance aperture. Using a curve fitting algorithm such as the Nelder-Mead simplex algorithm to fit the data, the scintillation index is found. The first correction factor is then computed as:

$$a = \frac{\sigma_z^2(x, y, L, t, 0)}{\sigma_z^2(x, y, L, t, D)} \quad (12)$$

To extract only the turbulence information and not the scene or sensor noise, for each row, r, or column, c, in the image, the 1-D Fourier transform is computed to obtain the 1-D PSD of turbulence, defined herein as V(k). In practice, for horizontal calculations a fast Fourier transform may be used by defining k as the spatial frequency in cycles/meter and the estimated 1-D PSD for each row, r, as:

$$V_r(k_x, y=r; t) = \Sigma_{n=1}^N \sigma_z^2(x, y=r; L, t, D) e^{-i 2\pi (k-1)(n-1)/N}, \quad (13)$$

A vertical calculation can be done by repeating this process for each column of pixels in the block of pixels. Because of the proportionality of these two constants, this process can fit the ensemble average of many strips of 1-D PSD data to a -5/3 power law and extract $c_n^2$ up to an overall constant. This PSD will follow the Kolmogorov spectrum in the inertial subrange such that if scaled perfectly:

$$V_r(k_x, t) = 0.1244 \, c_n^2(k_x, t) k_x^{-5/3} = \sim <b \cdot V(k_x, t)>_{all\,r} \quad (14)$$

The curve fit is best done on the linear equation solving for A:

$$\log_{10}(F(V(k_x, t))) = -5/3 \log_{10}(k_x) + A \quad (15)$$

$$A = \log_{10}(0.1244 c_n^2(k_x, t)/b) \quad (16)$$

Where b is the scaling constant related to the scenario. This can be repeated for all columns computing $V_c(k_y, t)$.

Figure 5B:
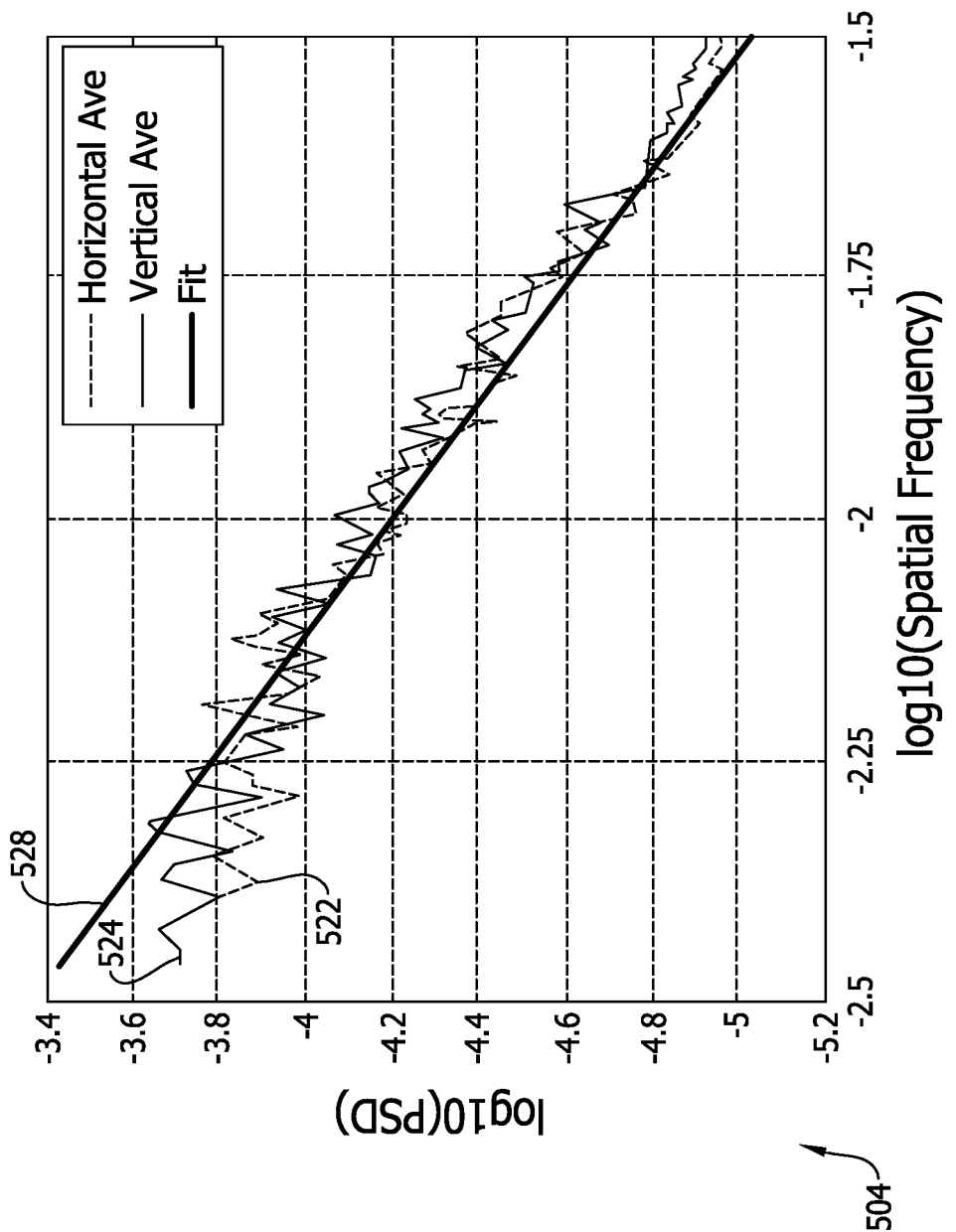
FIG. 5B illustrates an exemplary plot of the STSC Unscaled 1-D PSD for an exemplary image capture during a testing and data collection used to compute $C_n^2$.

FIG. 5B illustrates an exemplary plot of measured 1-D PSD for an exemplary image capture during a testing and data collection. In this plot, the vertical axis 504 represents a log scale of the PSD value while the horizontal axis 508 represents a log scale of spatial frequency. The horizontal average plot 522 represents an average value over all rows of the variance image. The vertical average plot 524 represents an average value over all columns of variance image. The fit plot 528, which is the log-normal straight line computed from the curve fit, in this case for the horizontal PSDs. The structure in the scene (bumps in spatial frequency) are thus removed from the $c_n^2$ via the curve fit to the Kolmogorov spectrum. Thus only the log-normal content with the turbulence remains.

The bumps on this PSD plots 522, 524 shown in FIG. 5B correspond to the periodic structure in the scene but are ignored using a curve fit. At this point the PSD is not properly scaled to get the path averaged $c_n^2$.

In order to get the scaling factor, b, the scenario needs to be considered. First consider the length scales. The scintillation index is computed in the optical axis direction (z), thus the units must be rescaled from the length scale associated with the z-dimension to the length scale associated with the x and y. In addition, correction of the scintillation index related to the relationship of the Rytov variance to $c_n^2$ must be considered. After manipulation of the equations, the scale factor, b is computed as:

$$b = \frac{2 \cdot \pi}{1.23}\left(\frac{\tan(IFOV) \cdot L}{v_z \cdot \tau}\right)^{2/3} \cdot k^{-7/6} \cdot L^{-11/6} \quad (17)$$

Since turbulence is weighted differently at different ranges to the sensor entrance aperture, the range to target, L, is not the range to a real target, but is the range corresponding to a Fresnel number of about 4. Considering the Prior work by Tofsted as outlined in [D. H. Tofsted, "Extended high-angular-frequency analysis of Turbulence effects on short-exposure imaging," SPIE Optical Engineering 53(4), 044112 (April 2014)] notes that for terrestrial imaging problems a Q in the range of ⅓ to 3 covers virtually all cases due to the path averaging effects. Because this disclosed method is computing a path averaged $c_n^2$ this method considers only a single range, L, corresponding to a Q number of about 2. This assumption is confirmed by data and is apparent in test images and data because the turbulence looks uniform regardless of whether it is in the near field (locate at bottom of an image) or far field (located at top of an image).

This method generally does provide a means to compute $c_n^2$ to within a factor of 2-3 under most conditions. Using the HCBS method in conjunction with this method, however, will align the STSC result with the mean HCBS trend. This hybrid approach combines the temporal stability of STSC with the average accuracy of HCBS thereby providing an additional new approach.

During testing, using the Photron data collected at frame rates from 125 to 2000 Hz over the course of the day (with changing heating patterns), this disclosed method was verified to accurately compute $c_n^2$. As compared to reference data from a scintillometer. To show this method would work at video rates, the data was decimated to 30 Hz. Multiple 30 Hz sliding data were analyzed, thus allowing for evaluation of statistics on a large sample size. Videos of the scene were taken throughout the day, typically every 15-30 minutes. This resulted in 24 data groups (video files) representing about 6-15 seconds of data each. During the entire test, the scintillometer data was also collected and compiled.

The STSC method uses temporal characteristics and as a result wind speed is used to rescale the temporal direction to a spatial scale using the Kolmogorov scales. The Kolmogorov scales are known by one of ordinary skill in the art and as such are not described herein. For simplicity, only a single wind speed number of 1.5 m/second was used for the scale factor but if anemometer data is available, real time correction for wind speed can be used.

Figure 6:
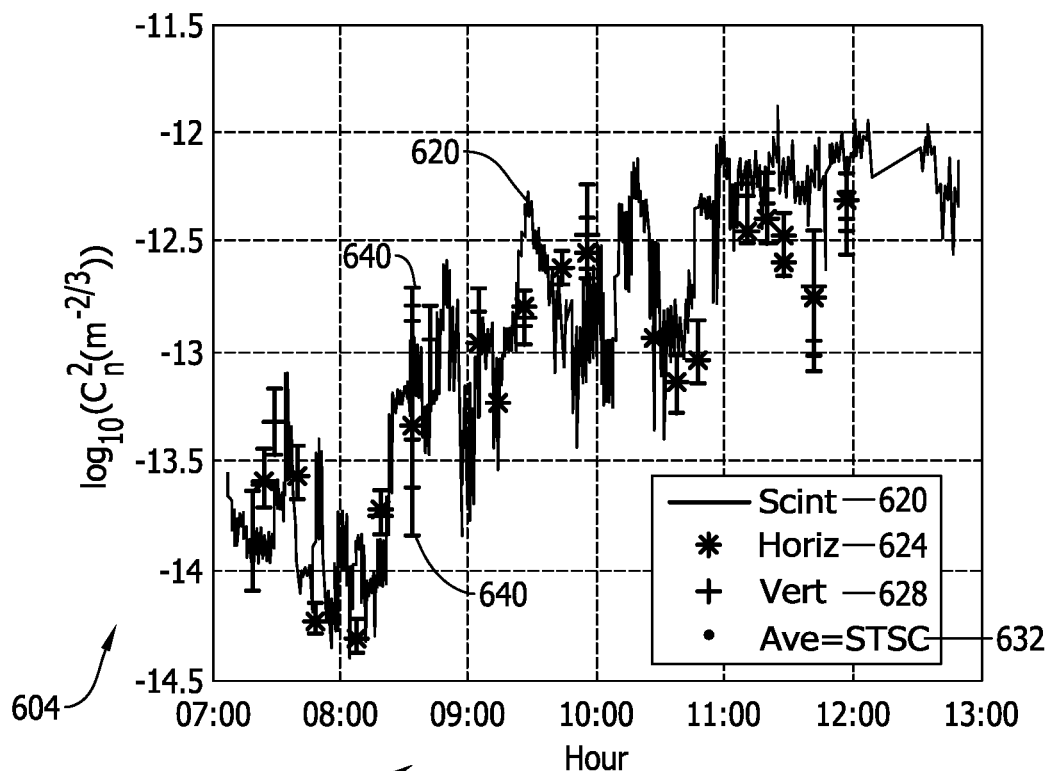
FIG. 6 a plot of the test results showing the STSC method data compared to the scintillometer data.

FIG. 6 is a plot of the test results showing the STSC method data compared to the scintillometer data. The vertical axis 604 represents or is related to $c_n^2$ on a log scale and the horizontal axis 608 represents time in hours. Four data sets are shown on the plot of FIG. 6, namely the scintillometer data 620, the one-dimensional horizontal data 624, the one-dimensional vertical data 628 and the average 632 of the two (one-dimensional horizontal data 624, the one-dimensional vertical data 628). Error bars 640 represent 3-sigma variation of the analyzed data. The data is presented based on a 30 frames per second rate over two orders of magnitude of $c_n^2$. As can be appreciated from the visual representation of FIG. 6 is that the STSC data 632 representation from the horizontal data 624 and vertical data 628 is highly accurate by correlation and tracking to the scintillometer data 620.

Combining STSC Method and HCBS Method

To provide an improved result, the STSC method and the HCBS method are combined. To combine the data from these methods of processing it is first assumed that the scale factor for the HCBS method is more accurate. The first step is to rescale all of the STSC data using a running average of the ratio of the HCBS and STSC data for some period of time. As a starting point, equal weights are assigned to the STSC horizontal, vertical and HCBS data. The STSC weights are each modified based on the standard deviation of the error. For the 3-sigma case the weights would be:

$$w_r = 0.33\left(1 - \frac{3\sigma_{err\_r}}{c_n^2(k_x, t)}\right) \quad (18)(20)$$

$$w_c = 0.33\left(1 - \frac{3\sigma_{err\_c}}{c_n^2(k_y, t)}\right) \quad (19)(20)$$

The HCBS weight is the remainder of the weight such that the total of the weights adds to 1.0. The combined $c_n^2$ is thus:

$$c_{n\_comb}^2(t) = w_r \cdot c_n^2(k_x,t) + w_c \cdot c_n^2(k_y,t) + w_{hcbs} \cdot c_{n\_hcbs}^2(t) \quad (20)$$

Combining these two methods, regardless of the mathematical process is novel and had not been done before. The fact both methods are based on different statistical approaches is contrary to convention thinking in the art and further re-enforces the non-obvious nature of this innovation.

Figure 7A:
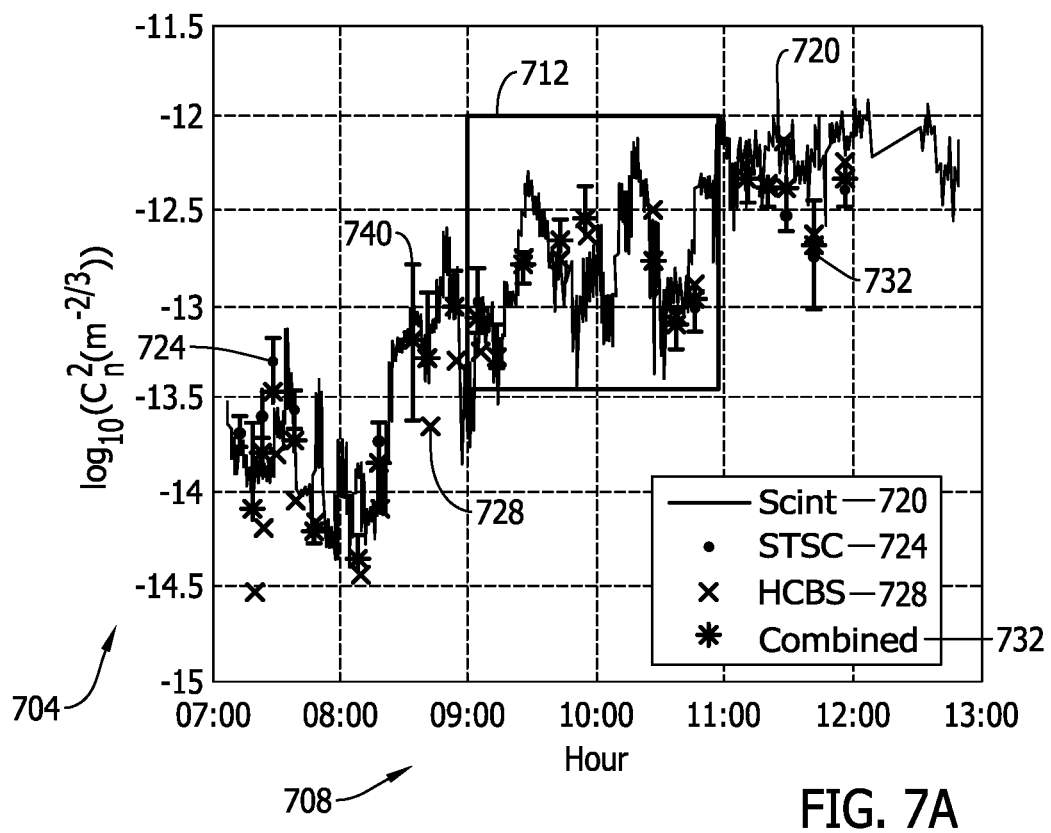
FIG. 7A illustrates a plot of the combined HCBS method data and STSC method data.
Figure 7B:
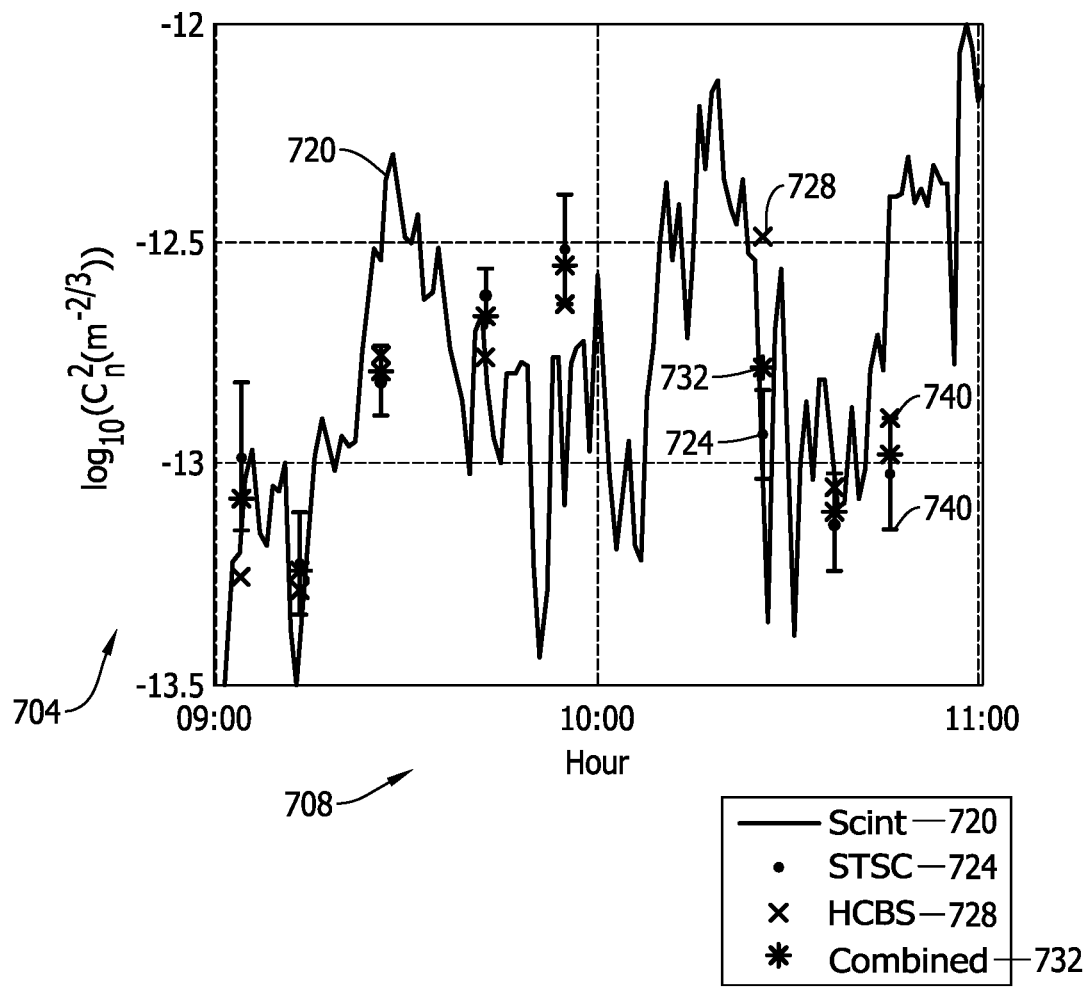
FIG. 7B is an enlarged version of a portion of the plot shown in FIG. 7A.

FIGS. 7A and 7B illustrates a plot of the combined data after these additional computations to combine HCBS method data and STSC method data. FIG. 7B is an enlarged portion of the block 712 shown in FIG. 7A. The combined data improves the outcome as compared to only using the HCBS method or STSC method. In both FIG. 7A and FIG. 7B the vertical axis 704 represents or is related to $c_n^2$ on a log scale and the horizontal axis 708 represents time in hours. Four data sets are shown on the plot of FIG. 7A and FIG. 7B, namely the scintillometer data plot 720, the STSC data plot 724, the HCBS data plot 728 and the combined data plot 732 (combined STSC data and HCBS data). Error bars 740 represent 3-sigma variation of the analyzed data. As can be seen visually from the plot, these methods track well with the scintillometer data.

SUMMARY

In summary, the apparatus and method disclosed herein collects image data and performs processing combined two methods (HCBS and STSC) to measure the strength of atmospheric turbulence for horizontal paths. Both methods are completely passive and require no scene targets, only some structure in the scene, and rely on image data alone, without a remotely located laser light transmitter/receiver. The combination of the two very different methods results in a consistent method to measure atmospheric turbulence strength over two orders of magnitude of $c_n^2$. This approach combines the spatial/temporal spectrum characterization (STSC) of turbulence thereby fitting the 1-D PSD of the scintillation index with the High Confidence Block Shift (HCBS) method. The STSC method involves refinement of a proportionality constant, provided by the HCBS method. The HCBS method relies on an algorithm to remove platform motion, which is not always accurate and may fail altogether when platform motion is on the order of global pointing jitter. Using error bars provided by the standard deviation in the set of 1-D PSD spectra helps determine when the STSC method itself is valid. The combined method overcomes drawbacks associated with each individual method and tracks extremely well with scintillometer data and is proposed to provide an alternative to a scintillometer for measurement of turbulence in the field. This method and system may be used to create alternative methods for image correction for horizontal paths and numerous other application which benefit from knowing turbulence.

The STSC method implicitly invokes Taylor's frozen turbulence hypothesis with inclusion of temporal averaging. Furthermore, because an index of refraction structure function is computed using a set of many frames it is much more tolerant to jitter. This reduces the computed error. However, an overall scale factor relies on knowing the in-situ wind speed, which is obviously not available in most situations. (While it can be measured, this presents added instrumentation). With this added instrumentation, this method can provide a good estimate by itself. Additionally, the assumption (used for the current analysis) that the size of the isoplanatic patch is larger than the entrance aperture can increase uncertainty with a large aperture sensor system.

The HCBS method relies on an angle of arrival (AoA) method. This method is based upon the arriving phase of the wavefront, and all scale factors are easily determined mathematically. Unfortunately, this method is extremely susceptible to platform jitter and object motion due to wind. Polychromatic blurring (solar illumination is not monochromatic. typically peaked around Nikon green at 555 nm) further affects variability since it is a phase-based method. Consequently, it requires a higher frame rate and shows more fluctuation than desired. As a stand-alone method the AoA extraction has heretofore proved unreliable, especially in the higher D/r0 environments where extended range targets span multiple isoplanatic patches.

The hybrid approach disclosed herein combines both of the above techniques. The differences between these two methods make them ideal complements of each other—one needing jitter isolation, the other needing a scale factor—and the combination provides a robust, passive method to measure path-integrated turbulence strength.

FIG. 8 is a block diagram showing example or representative computing devices and associated elements that may be used to implement the systems method and apparatus described herein. FIG. 8 shows an example of a generic computing device 800A and a generic mobile computing device 850A, which may be used with the techniques described here. Computing device 800A is intended to represent various forms of digital computers, such as laptops, desktops, workstations, personal digital assistants, servers, blade servers, mainframes, and other appropriate computers. Computing device 850A is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800A includes a processor 802A, memory 804A, a storage device 806A, a high-speed interface or controller 808A connecting to memory 804A and high-speed expansion ports 810A, and a low-speed interface or controller 812A connecting to low-speed bus 814A and storage device 806A. Each of the components 802A, 804A, 806A, 808A, 810A, and 812A, are interconnected using various busses, and may be mounted on a common motherboard or in other manners as appropriate. The processor 802A can process instructions for execution within the computing device 800A, including instructions stored in the memory 804A or on the storage device 806A to display graphical information for a GUI on an external input/output device, such as display 816A coupled to high-speed controller 808A. In other implementations, multiple processors and/or multiple buses may be used, as appropriate, along with multiple memories and types of memory. Also, multiple computing devices 800A may be connected, with each device providing portions of the necessary operations (e.g., as a server bank, a group of blade servers, or a multi-processor system).

The memory 804A stores information within the computing device 800A. In one implementation, the memory 804A is a volatile memory unit or units. In another implementation, the memory 804A is a non-volatile memory unit or units. The memory 804A may also be another form of computer-readable medium, such as a magnetic or optical disk.

The storage device 806A is capable of providing mass storage for the computing device 800A. In one implementation, the storage device 806A may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804A, the storage device 806A, or memory on processor 802A.

The high-speed controller 808A manages bandwidth-intensive operations for the computing device 800A, while the low-speed controller 812A manages lower bandwidth-intensive operations. Such allocation of functions is exemplary only. In one implementation, the high-speed controller 808A is coupled to memory 804A, display 816A (e.g., through a graphics processor or accelerator), and to high-speed expansion ports 810A, which may accept various expansion cards (not shown). In the implementation, low-speed controller 812A is coupled to storage device 806A and low-speed bus 814A. The low-speed bus 814, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800A may be implemented in a number of different forms, as shown in the figure. For example, it may be implemented as a standard server 820A, or multiple times in a group of such servers. It may also be implemented as part of a rack server system 824A. In addition, it may be implemented in a personal computer such as a laptop computer 822A. Alternatively, components from computing device 800A may be combined with other components in a mobile device (not shown), such as device 850A. Each of such devices may contain one or more of computing device 800A, 850A, and an entire system may be made up of multiple computing devices 800A, 850A communicating with each other.

Computing device 850A includes a processor 852A, memory 864A, an input/output device such as a display 854A, a communication interface 866A, and a transceiver 868A, among other components. The device 850A may also be provided with a storage device, such as a microdrive or other device, to provide additional storage. Each of the components 850A, 852A, 864A, 854A, 866A, and 868A, are interconnected using various buses, and several of the components may be mounted on a common motherboard or in other manners as appropriate.

The processor 852A can execute instructions within the computing device 850A, including instructions stored in the memory 864A. The processor may be implemented as a chipset of chips that include separate and multiple analog and digital processors. The processor may provide, for example, for coordination of the other components of the device 850A, such as control of user interfaces, applications run by device 850A, and wireless communication by device 850A.

Processor 852A may communicate with a user through control interface 858A and display interface 856A coupled to a display 854A. The display 854A may be, for example, a TFT LCD (Thin-Film-Transistor Liquid Crystal Display) or an OLED (Organic Light Emitting Diode) display, or other appropriate display technology. The display interface 856A may comprise appropriate circuitry for driving the display 854A to present graphical and other information to a user. The control interface 858A may receive commands from a user and convert them for submission to the processor 852A. In addition, an external interface 862A may be provide in communication with processor 852A, so as to enable near area communication of device 850A with other devices. External interface 862A may provide, for example, for wired communication in some implementations, or for wireless communication in other implementations, and multiple interfaces may also be used.

The memory 864A stores information within the computing device 850A. The memory 864A can be implemented as one or more of a computer-readable medium or media, a volatile memory unit or units, or a non-volatile memory unit or units. Expansion memory 874A may also be provided and connected to device 850A through expansion interface 872A, which may include, for example, a SIMM (Single In Line Memory Module) card interface. Such expansion memory 874A may provide extra storage space for device 850A, or may also store applications or other information for device 850A. Specifically, expansion memory 874A may include instructions to carry out or supplement the processes described above, and may include secure information also. Thus, for example, expansion memory 874A may be provide as a security module for device 850A, and may be programmed with instructions that permit secure use of device 850A. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864A, expansion memory 874A, or memory on processor 852A, that may be received, for example, over transceiver 868A or external interface 862A.

Device 850A may communicate wirelessly through communication interface 866A, which may include digital signal processing circuitry where necessary. Communication interface 866A may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868A. In addition, short-range communication may occur, such as using a Bluetooth, Wife, or other such transceiver (not shown). In addition, GPS (Global Positioning system) receiver module 870A may provide additional navigation- and location-related wireless data to device 850A, which may be used as appropriate by applications running on device 850.

Device 850A may also communicate audibly using audio codec 860, which may receive spoken information from a user and convert it to usable digital information. Audio codec 860A may likewise generate audible sound for a user, such as through a speaker, e.g., in a handset of device 850A. Such sound may include sound from voice telephone calls, may include recorded sound (e.g., voice messages, music files, etc.) and may also include sound generated by applications operating on device 850A.

The computing device 850A may be implemented in a number of different forms, as shown in the figure. For example, it may be implemented as a cellular telephone 880A. It may also be implemented as part of a smart phone 882A, personal digital assistant, a computer tablet, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system (e.g., computing device 800A and/or 850A) that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In the example embodiment, computing devices 800A and 850A are configured to receive and/or retrieve electronic documents from various other computing devices connected to computing devices 800A and 850A through a communication network, and store these electronic documents within at least one of memory 804A, storage device 806A, and memory 864A. Computing devices 800A and 850A are further configured to manage and organize these electronic documents within at least one of memory 804A, storage device 806A, and memory 864A using the techniques described herein.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included. For example, while online gaming has been referred to throughout, other applications of the above embodiments include online or web-based applications or other cloud services.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "identifying" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments of the invention may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the invention. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

While the disclosure has been described in terms of various specific embodiments, it will be recognized that the disclosure can be practiced with modification within the spirit and scope of the claims.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

Due to the complex nature of this subject matter, the following references are cited below and incorporated by reference in their entirety. These reference further support and provide background for the subject matter disclosed above.

SUPPORTING REFERENCES

1. S. Goldstein, "Fluid mechanics in the first half of this century," Annual Review of Fluid Mechanics 1, 1-29 (1969).
2. S. Zamek and Y. Yitzhaky, "Turbulence strength estimation from an arbitrary set of atmospherically degraded images," J. Opt. Soc. Am. A 23, 3106-3113 (2006).
3. R. L. Espinola, S. Aghera, R. Thompson, and J. Miller, "Turbulence degradation and mitigation performance for handheld weapon ID," Proc. SPIE 8355, 83550S (2012).
4. M. G. Sterenborg, J. P. V. Poiares Baptista, and S. Baler, "Determining the refractive index structure constant using high-resolution radiosonde data," http://www.sat.ltu.se/members/sab/publications/pedro_scint/scint_paper.pdf, accessed Sep. 23, 2013.
5. J. M. Beckers, "Adaptive optics for astronomy: Principles, performance, and applications," Ann. Rev. Astron. Astrophys. 31, 13-62 (1993).
6. I. G. Renhorn, T. Svensson, and G. D. Boreman, "Experimental observation of spatial correlation of scintillations from an extended incoherent source," Opt. Eng. 52, 026001 (2013).
7. C. Max, "Adaptive Optics and its Applications," presented in Lecture 3 of Astronomy 289C at the University of California, Santa Cruz, 8 Apr. 2010.
8. D. H. Tofsted, "Turbulence simulation: Outer scale effects on the refractive index spectrum," Army Research Laboratory Technical Report ARL-TR-548, http://www.arl.army.mil/arlreports/2000/ARL-TR-548.pdf, November 2000, accessed Apr. 9, 2015.
9. A. N. Kolmogorov, "The local structure of turbulence in incompressible viscous fluid for very large Reynolds numbers," Dokl. Akad. Nauk SSSR 30, 301-305 (1941).
10. L. C. Andrews and R. L. Phillips, *Laser Beam Propagation through Random Media*, Second Edition (SPIE Press, 2005).
11. S. Robinson, J. S. Accetta, and D. L. Shumaker, *The Infrared and Electro-Optical Systems Handbook, Volume* 8: *Emerging Systems and Technologies* (Infrared Information Analysis Center and SPIE Optical Engineering Press, 1993).
12. V. I. Tatarskii, *The Effects of the Turbulent Atmosphere on Wave Propagation* (Israel Program for Scientific Translations, 1971).
13. V. I. Tatarskii, A. Ishimaru, and V. U. Zavorotny, *Wave Propagation in Random Media (Scintillation)* (SPIE Optical Engineering Press and Institute of Physics Publishing-Techno House, 1993).
14. L. C. Andrews, R. L. Phillips, and C. Y. Hopen, *Laser Beam Scintillation with Applications* (SPIE Press, 2001).
15. D. Fried, "Optical heterodyne detection of an atmospherically distorted signal wavefront," Proc. IEEE 55, 57-77 (1967).
16. P. Martinez, J. Kolb, M. Sarazin, and A. Tokovinin, "On the Difference between Seeing and Image Quality: When the Turbulence Outer Scale Enters the Game," The Messenger 141, 5-8 (2010).
17. M. S. Belen'kii, J. M. Stewart, and P. Gillespie, "Turbulence-induced edge image waviness: theory and experiment," Appl. Opt. 40, 1321-1328 (2001).
18. M. A. Vorontsov and G. W. Carhart, "Anisoplanatic imaging through turbulent media: image recovery by local information fusion from a set of short-exposure images," J. Opt. Soc. Am. A 18, 1312-1324 (2001).
19. D. Terry, R. Goldflam, and K. Doughty, "Real-Time Atmospheric Turbulence Mitigation Sensor System (RAMS$^2$)," presented at the Military Sensor Symposium Parallel Conference, Pasadena, Calif., March 2012.
20. M. S. Belen'kii, D. W. Roberts, J. M. Stewart, G. G. Gimmestad, and W. R. Dagle, "Experimental validation of the differential image motion lidar concept," Opt. Lett. 25, 518-520 (2000)
21. D. H. Tofsted, "Extended high-angular-frequency analysis of Turbulence effects on short-exposure imaging," SPIE Optical Engineering 53(4), 044112 (April 2014)

22. G. R. Ochs, S. F. Clifford and Ting-I Wang, Appl. Opt. Vol. 15, 403 (1976)

23. GURVICH, A. S.; STAROBINETS, A.; CHEREMUKHIN, A. M. (1974): A method of determining the structure characteristic of the index of refraction in the atmosphere from the image of a radial target, Izv. Acad. Scien. USSR, Atm. and Ocean. Phys. 10, pp. 248

24. D. H. Tofsted, "Reanalysis of turbulence effects on short-exposure passive imaging," Optical Engineering 50(1), 016001 (January 2011)

What is claimed is:

1. A method for determining turbulence information for an atmospheric distance between a remote scene and an image capture device comprising:
    capturing an image reflected from the remote scene with the image capture device, the image reflected from the remote scene does not include laser light or laser light reflected from the remote scene;
    generating image data with the image capture device, the image data representing an image of the scene;
    storing the image data in a memory;
    performing spatial/temporal spectrum characterization processing on at least a portion of the image data to generate spatial/temporal spectrum characterization turbulence data;
    performing high confidence block shift processing on at least a portion of the image data to generate high confidence block shift turbulence data; and
    combining the spatial/temporal spectrum characterization turbulence data and the high confidence block shift turbulence data to calculate the turbulence information.

2. The method of claim 1 wherein the image data is an array of pixel data from twenty or more frames of successive image data from the image capture device.

3. The method of claim 1 wherein the image capture device is a video camera.

4. The method of claim 1 wherein spatial/temporal spectrum characterization processing includes:
    calculate or receive a scale factor based on system parameters;
    reading image data to create an image stack;
    calculate variance data over time for pixels in the image stack;
    perform a Fourier transform on the variance data to generate power spectral density data;
    average the power spectral density data to obtain average power spectral density data;
    process the average power spectral density data in relation to a Kolmogorov spectrum to obtain a value proportional to the index of refraction structure constant ($c_n^2$); and
    multiply the index of refraction structure constant ($c_n^2$) by the scale factor to generate the spatial/temporal spectrum characterization data.

5. The method of claim 1 wherein high confidence block shift processing includes:
    process image data to create image data blocks;
    calculate an information content metric for one or more image data blocks;
    track information content metric for one or more image data blocks over time;
    record or designate block tracks which meet a predetermined threshold as surviving blocks;
    calculate pixel variance value for surviving blocks related to $c_n^2$;
    calculate platform motion using differential frame motion;
    for one or more pixel variance values, calculate mean variance from one or more sets of pixel variance values to determine the index of refraction structure constant ($c_n^2$); and
    calculate the high confidence block shift turbulence data based on platform movement and ($c_n^2$).

6. The method of claim 1 wherein combining the spatial/temporal spectrum characterization turbulence data and the high confidence block shift turbulence data includes rescaling the spatial/temporal spectrum characterization turbulence data based on an average of a ratio of the high confidence block shift turbulence data and spatial/temporal spectrum characterization data for a period of time.

7. The method of claim 1 wherein further comprising processing the image data utilizing the turbulence data to remove aberrations in the image caused by the turbulence over the atmospheric distance.

8. A non-transitory computer-readable medium storing non-transitory computer-executable instructions for passively determining turbulence information for an atmospheric distance, wherein the computer-executable instructions are executed on a processor and comprise the steps of:
    capturing image data with an image capture device, the image data representing an image of a scene over the atmospheric distance such that the image of the remote scene does not include laser light from the remote scene or a reflected laser light from a laser light source at or near the image capture device;
    performing spatial/temporal spectrum characterization processing on at least a portion of the image data to generate spatial/temporal spectrum characterization data;
    performing high confidence block shift processing on at least a portion of the image data to generate high confidence block shift turbulence data; and
    combining the spatial/temporal spectrum characterization turbulence data and the high confidence block shift turbulence data to calculate the turbulence information for the atmospheric distance.

9. The computer-readable medium of claim 8, wherein the image data is an array of pixel data from twenty or more frames of successive image data from the image capture device.

10. The computer-readable medium of claim 8, wherein the image capture device is a video camera.

11. The computer-readable medium of claim 8, wherein the method is passive, using only image data captured at a location of the image capture device without a remote optic signal transmitter.

12. The computer-readable medium of claim 8, wherein high confidence block shift processing includes:
    process image data to create image data blocks;
    calculate an information content metric for one or more image data blocks;
    track information content metric for one or more image data blocks over time;
    record or designate block tracks which meet a predetermined threshold as surviving blocks;
    calculate pixel variance value for surviving blocks related to $c_n^2$;
    calculate platform motion using differential frame motion;
    for one or more pixel variance values, calculate mean variance from one or more sets of pixel variance values to determine the index of refraction structure constant ($c_n^2$); and
    calculate the high confidence block shift turbulence data based on platform movement and ($c_n^2$).

13. The computer-readable medium of claim 8, wherein combining the spatial/temporal spectrum characterization turbulence data and the high confidence block shift turbulence data includes rescaling the spatial/temporal spectrum characterization turbulence data based on an average of a ratio of the high confidence block shift turbulence data and spatial/temporal spectrum characterization data for a period of time.

14. The computer-readable medium of claim 8, further comprising processing the image data utilizing the turbulence data to remove aberrations in the image caused by the turbulence over the atmospheric distance.

15. A system for determining turbulence information for an atmospheric distance, the system comprising:
   an image capture device configured to capture frames of image data, the image data being passive such that the image data does not include data which represents light from a laser or reflected laser light;
   a processor configured to execute non-transitory computer-executable instructions based on the image data to calculate turbulence data; and
   a memory storing the non-transitory computer-executable instructions for determining turbulence information for an atmospheric distance, wherein the computer-executable instructions are executed on the processor and comprise the steps of:
      capturing image data with an image capture device and storing the image data in the memory, the image data representing an image of a scene over the atmospheric distance;
      processing at least a portion of the image data to generate spatial/temporal spectrum characterization data;
      processing at least a portion of the image data to generate high confidence block shift turbulence data; and
      processing the spatial/temporal spectrum characterization turbulence data and the high confidence block shift turbulence data to calculate the turbulence information for the atmospheric distance.

16. The system of claim 15 wherein the image data is an array of pixel data from twenty or more frames of successive image data from the image capture device.

17. The system of claim 15 wherein the image capture device is a video camera.

18. The system of claim 15 wherein the method is passive, using only image data captured at a location of the image capture device without a remote optic signal transmitter.

19. The system of claim 15 wherein processing at least a portion of the image data to generate high confidence block shift turbulence data includes:
   process image data to create image data blocks;
   calculate an information content metric for one or more image data blocks;
   track information content metric for one or more image data blocks over time;
   record or designate block tracks which meet a predetermined threshold as surviving blocks;
   calculate pixel variance value for surviving blocks related to $c_n^2$;
   calculate platform motion using differential frame motion;
   for one or more pixel variance values, calculate mean variance from one or more sets of pixel variance values to determine the index of refraction structure constant $(c_n^2)$; and
   calculate the high confidence block shift turbulence data based on platform movement and $(c_n^2)$.

20. The system of claim 15 wherein processing the spatial/temporal spectrum characterization turbulence data and the high confidence block shift turbulence data includes rescaling the spatial/temporal spectrum characterization turbulence data based on an average of a ratio of the high confidence block shift turbulence data and spatial/temporal spectrum characterization data for a period of time.

21. The system of claim 15 further comprising processing the image data utilizing the turbulence data to remove aberrations in the image caused by the turbulence over the atmospheric distance.

22. The system of claim 15 wherein processing at least a portion of the image data to generate spatial/temporal spectrum characterization data includes:
   calculate or receive a scale factor based on system parameters;
   reading image data to create an image stack;
   calculate variance data over time for pixels in the image stack;
   perform a Fourier transform on the variance data to generate power spectral density data;
   average the power spectral density data to obtain average power spectral density data;
   process the average power spectral density data in relation to a Kolmogorov spectrum to obtain a value proportional to the index of refraction structure constant $(c_n^2)$; and
   multiply the index of refraction structure constant $(c_n^2)$ by the scale factor to generate the spatial/temporal spectrum characterization data.

23. A method for determining turbulence information for an atmospheric distance between a remote scene and an image capture device comprising:
   directing the image capture device toward a remote scene to capture an image;
   capturing the image reflected from the remote scene with the image capture device, wherein the remote scene does not include:
      a laser light source directing laser light to the image capture device or
      reflected laser light traveling from the remote scene to the image capture device;
   creating image data with the image capture device, the image data representing an image of the remote scene;
   storing the image data in a memory;
   processing at least a portion of the image data to generate spatial/temporal spectrum characterization turbulence data;
   processing at least a portion of the image data to generate high confidence block shift turbulence data; and
   processing the spatial/temporal spectrum characterization turbulence data and the high confidence block shift turbulence data to calculate the turbulence information.

* * * * *